United States Patent
Wakisaka et al.

(10) Patent No.: US 8,492,675 B2
(45) Date of Patent: Jul. 23, 2013

(54) LASER WELDING AL AND FE MEMBERS WITH ZN FILLER

(75) Inventors: Taisei Wakisaka, Tochigi (JP); Tokuji Okumura, Tochigi (JP); Takanori Suzuki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 242 days.

(21) Appl. No.: 12/933,578

(22) PCT Filed: Apr. 21, 2009

(86) PCT No.: PCT/JP2009/057928
§ 371 (c)(1),
(2), (4) Date: Sep. 20, 2010

(87) PCT Pub. No.: WO2009/131124
PCT Pub. Date: Oct. 29, 2009

(65) Prior Publication Data
US 2011/0020666 A1 Jan. 27, 2011

(30) Foreign Application Priority Data

Apr. 21, 2008 (JP) ................. 2008-110023
Sep. 29, 2008 (JP) ................. 2008-250376
Dec. 15, 2008 (JP) ................. 2008-318439
Jan. 23, 2009 (JP) ................. 2009-012956

(51) Int. Cl.
*B23K 26/00* (2006.01)
*B23K 35/12* (2006.01)
*B23K 1/19* (2006.01)

(52) U.S. Cl.
USPC ............... 219/121.64; 228/245; 228/262.43; 228/262.5

(58) Field of Classification Search
USPC ......................... 219/121.63, 121.64
See application file for complete search history.

(56) References Cited

U.S. PATENT DOCUMENTS

| | | | | |
|---|---|---|---|---|
| 3,341,680 A * | 9/1967 | Rjabov et al. | .................... | 219/73 |
| 4,251,709 A * | 2/1981 | Schumacher | ............ | 219/121.14 |
| 4,737,612 A * | 4/1988 | Bruck et al. | ............. | 219/121.64 |
| 4,969,255 A * | 11/1990 | Schmidt et al. | ................ | 29/726 |
| 5,250,783 A * | 10/1993 | Nishi et al. | ............... | 219/121.64 |
| 5,283,415 A * | 2/1994 | Nishi et al. | ............... | 219/121.64 |
| 5,393,956 A * | 2/1995 | Guth et al. | ............... | 219/121.64 |
| 5,760,365 A * | 6/1998 | Milewski et al. | ........ | 219/121.64 |
| 5,879,416 A * | 3/1999 | Nakamura et al. | ............ | 29/623.2 |
| 6,222,150 B1 * | 4/2001 | Nomura et al. | ............ | 219/78.02 |
| 6,602,775 B1 * | 8/2003 | Chen et al. | ..................... | 438/612 |
| 6,852,945 B2 * | 2/2005 | Harth, III | ................. | 219/121.64 |
| 7,150,797 B2 * | 12/2006 | Tsushima et al. | ............... | 148/24 |
| 7,154,065 B2 * | 12/2006 | Martukanitz et al. | .... | 219/121.64 |

(Continued)

FOREIGN PATENT DOCUMENTS

DE 10017453 A1 10/2001
EP 0498154 8/1992

(Continued)

*Primary Examiner* — Kiley Stoner
*Assistant Examiner* — Carlos Gamino
(74) *Attorney, Agent, or Firm* — Rankin, Hill & Clark LLP

(57) ABSTRACT

In joining an Fe-based metallic member comprising an Fe-based material and an Al-based metallic member comprising an Al-based material by a Zn-based filler metal, a joined part of the Fe-based metallic member is heated at a temperature higher than a melting point of the Fe-based material.

7 Claims, 32 Drawing Sheets

U.S. PATENT DOCUMENTS

| | | | |
|---|---|---|---|
| 7,521,129 B2 * | 4/2009 | Takeda et al. | 428/653 |
| 7,800,011 B2 * | 9/2010 | Fukuda et al. | 219/74 |
| 7,858,900 B2 * | 12/2010 | Orye et al. | 219/121.64 |
| 7,875,827 B2 * | 1/2011 | Palmquist et al. | 219/121.64 |
| 7,897,891 B2 * | 3/2011 | Chen et al. | 219/121.63 |
| 7,943,883 B2 * | 5/2011 | Doira et al. | 219/118 |
| 8,020,749 B2 * | 9/2011 | Kobayashi et al. | 228/178 |
| 2009/0017328 A1 * | 1/2009 | Katoh et al. | 428/653 |

FOREIGN PATENT DOCUMENTS

| | | |
|---|---|---|
| EP | 1806200 A1 | 7/2007 |
| EP | 1997579 A1 | 12/2008 |
| JP | 3-285761 | 12/1991 |
| JP | 3-291160 | 12/1991 |
| JP | 4-046695 | 2/1992 |
| JP | 2002-137077 | 5/2002 |
| JP | 2003-311452 | 11/2003 |
| JP | 2004-223548 | 8/2004 |
| JP | 3740858 | 11/2005 |
| JP | 2007-90436 | 4/2007 |
| JP | 2008-006465 | 1/2008 |
| JP | 2008-137034 | 6/2008 |
| WO | 2007/094203 A1 | 8/2007 |

* cited by examiner (A)

(B)

(A)

(B)

(A)

(B) 
Fe-BASED METAL MEMBER — JOINING LAYER
— INTERMETALLIC COMPOUND LAYER (C) 
Fe-BASED METAL MEMBER — INTERMETALLIC COMPOUND LAYER
— JOINING LAYER (D) 
Fe-BASED METAL MEMBER — JOINING LAYER
— INTERMETALLIC COMPOUND LAYER (A)

Fe-BASED METAL MEMBER — JOINING LAYER (B)

— INTERMETALLIC COMPOUND LAYER

Fe-BASED METAL MEMBER — INTERMETALLIC COMPOUND LAYER (C)

— JOINING LAYER

Fe-BASED METAL MEMBER — JOINING LAYER (D)

— INTERMETALLIC COMPOUND LAYER (A)

(B) Fe-BASED METAL MEMBER — JOINING LAYER — INTERMETALLIC COMPOUND LAYER (C) Fe-BASED METAL MEMBER — INTERMETALLIC COMPOUND LAYER — JOINING LAYER (D) Fe-BASED METAL MEMBER — JOINING LAYER — INTERMETALLIC COMPOUND LAYER (A)

(B)

Fe-BASED METAL MEMBER — JOINING LAYER — INTERMETALLIC COMPOUND LAYER (C)

Fe-BASED METAL MEMBER — INTERMETALLIC COMPOUND LAYER — JOINING LAYER (D)

Fe-BASED METAL MEMBER — JOINING LAYER (A)

(B)

Fe-BASED METAL MEMBER — JOINING LAYER — INTERMETALLIC COMPOUND LAYER (C)

Fe-BASED METAL MEMBER — INTERMETALLIC COMPOUND LAYER — JOINING LAYER (D)

Fe-BASED METAL MEMBER — INTERMETALLIC COMPOUND LAYER — JOINING LAYER — Al-BASED METAL MEMBER (A)

(B) 
Fe-BASED METAL MEMBER
JOINING LAYER
INTERMETALLIC COMPOUND LAYER (C) 
Fe-BASED METAL MEMBER
INTERMETALLIC COMPOUND LAYER
JOINING LAYER (D) 
Fe-BASED METAL MEMBER
INTERMETALLIC COMPOUND LAYER
JOINING LAYER (A)

(B)

(A)

(B)

(A)

(B)

(A)

(B)

(A)

(B)

(C)

(D)

(A)

(B)

(C)

(D)

(A)

(B)

(A)

(B)

(A)

(B) Fe-BASED METAL MEMBER — JOINING LAYER — INTERMETALLIC COMPOUND LAYER (C) Fe-BASED METAL MEMBER — INTERMETALLIC COMPOUND LAYER — JOINING LAYER (D) Fe-BASED METAL MEMBER — JOINING LAYER — INTERMETALLIC COMPOUND LAYER (A)

(B) Fe-BASED METAL MEMBER — JOINING LAYER — INTERMETALLIC COMPOUND LAYER (C) Fe-BASED METAL MEMBER — INTERMETALLIC COMPOUND LAYER — JOINING LAYER (D) Fe-BASED METAL MEMBER — JOINING LAYER (A)

(B)

Fe-BASED METAL MEMBER — JOINING LAYER
— INTERMETALLIC COMPOUND LAYER (C)

Fe-BASED METAL MEMBER — INTERMETALLIC COMPOUND LAYER
— JOINING LAYER (D)

Fe-BASED METAL MEMBER — INTERMETALLIC COMPOUND LAYER
— JOINING LAYER
Al-BASED METAL MEMBER (A)

(B)

(A)

Fe-BASED METAL MEMBER

JOINING LAYER (B)

METALLIC COMPOUND LAYER NOT OBSERVED

Fe-BASED METAL MEMBER

JOINING LAYER

LASER WELDING AL AND FE MEMBERS WITH ZN FILLER

TECHNICAL FIELD

The present invention relates to a method for joining a Fe-based metallic member and an Al-based metallic member by interposing a filler metal between the Fe-based metallic member and the Al-based metallic member, a joint structure, and a filler metal.

BACKGROUND ART

Joint structure of metallic members, such as various joints, is produced by joining dissimilar metallic members. In the joining of dissimilar metallic members, brazing is conducted by irradiating a brazing filler metal interposed between those dissimilar metallic members with laser beam, and heating the brazing filler metal. A joining layer is formed thereby between the dissimilar metallic members. Thus, a joint structure of metallic members is produced.

For example, in the case of using a Fe-based metallic member containing a Fe-based material and an Al-based metallic member containing an Al-based material as dissimilar metallic members, Al and Zn do not form a compound layer and forms an eutectic structure in a wide range. For this reason, a Zn-based brazing filler metal is used as a brazing filler metal. This can ensure strength between the Al-based metallic member and the joining layer.

In order to suppress growth of a reaction layer (for example, intermetallic compound layer) formed in the interface part between the Fe-based metallic member and the joining layer, it is effective to decrease a reaction temperature and shorten a reaction time. For this reason, Al which decreases a melting point of a brazing filler metal by forming an eutectic alloy together with Zn is used as an additive element (for example, see Patent Document 1).

However, in the case that an intermetallic compound layer formed in the interface part between the Fe-based metallic member and the joining layer is brittle, the breakage may be generated in such the intermetallic compound layer. As a result, strength of a joint structure of dissimilar metallic members was considerably decreased as compared with that of a joint structure of similar metallic members.

When joining is conducted by laser irradiation at low temperatures, heat input into a joined part of dissimilar metallic members is conducted by thermal conduction from a surface of the brazing filler metal. Therefore, in the interface part of the joined part, thermal history is different every site. For this reason, in the interface part of the joined part, a reaction layer grows heterogeneously, thereby partially forming an unreacted layer and increasing a thickness of the reaction layer. As a result, joint strength was decreased. Particularly, in order to obtain good joining in the joining of dissimilar metallic members, a range of a joining temperature is limited to a predetermined range, unlike similar metallic members. Therefore, the problem due to the thermal history was serious.

PRIOR ART REFERENCES

Patent Document

Patent Document 1: Japanese Patent No. 3740858

SUMMARY OF THE INVENTION

One or more examples of the present invention provide a method for joining metallic members and a joint structure.

The method can improve joint strength between a Fe-based metallic member and an Al-based metallic member by increasing joint strength in the interface parts between the Fe-based metallic member and a joining layer.

The present inventors made keen investigations to heating technology at the joining of a Fe-based metallic member and an Al-based metallic member using a Zn-based filler metal. In the conventional joining using the Zn-based filler metal, only the Zn-based filler metal was heated so as not to melt the Fe-based metallic member. As a result of investigations to the conventional joining, the present inventors have found that joint strength between the Fe-based metallic member and the joining layer having a Zn-based filler metal can be increased by melting the joined part of the Fe-based metallic member by heating at a temperature higher than a melting point of the Fe-based material.

According to one or more examples of the present invention, in a method for joining the Fe-based metallic member containing the Fe-based material and the Al-based metallic member containing the Al-based material by interposing the Zn-based filler metal between the Fe-based metallic member and the Al-based metallic member, the joined part of the Fe-based metallic member is heated at the temperature higher than the melting point of the Fe-based material at the joining.

In the method for joining metallic members according to the above examples, the joined part of the Fe-based metallic member containing the Fe-based material is heated at the temperature higher than the melting point of the Fe-based material at the joining. Therefore, an Al—Fe—Zn system intermetallic compound layer containing Al as a main component can be formed in the interface part between the Fe-based metallic member and the joining layer containing the Zn-based filler metal. The intermetallic compound layer has high ductility, so that joint strength between the Fe-based metallic member and the joining layer can be increased. Consequently, joint strength between the Fe-based metallic member and the Al-based metallic member can be improved. Furthermore, since the joined part of the Fe-based metallic member is heated at the temperature higher than the melting point of the Fe-based material as described above, the Zn-based material and a Fe—Zn-based material vaporize. By this, a plated portion plated on the Fe-based material vaporizes regardless of the kinds of plating such as GA plating or GI plating, and as a result, good joint part can be obtained regardless of the kinds of plating. Furthermore, an oxide coating film on the surface of the Fe-based material is removed by vapor pressure in the melting and the vaporization by overheating. Therefore, even though flux is not used, good joining of dissimilar materials can be conducted. The term "joined part" used herein means a predetermined joint part between the Fe-based metallic member and the Al-based metallic member before joining, and the term "joint part" used herein means the predetermined joint part after joining.

Various constitutions can be used in the method for joining metallic members according to the above examples. For example, a groove shape is formed by the Fe-based metallic member and the Al-based metallic member, a Zn-based filler metal is placed in the groove shape, and in the joining, a center line of laser beam can be positioned at the Fe-based metal member side relative to the center line of the groove shape. In this embodiment, the Fe-based material of the Fe-based metallic member can selectively be melted. Therefore, an intermetallic compound layer can be formed into a stable layer shape over the entire interface part between the Fe-based metallic member and the joining layer. Furthermore, since the Al-based material of the Al-based metallic member is not excessively heated, the Al-based material can be prevented from dropping down. Consequently, joint strength between the Fe-based metallic member and the Al-based metallic member can further be improved.

The joined part of the Fe-based metallic member can be heated such that a key hole is formed in the Fe-based metallic member at the joining. The "key hole" used herein means a hollow portion formed by melting a metallic member. In this embodiment, the Zn-based filler metal flows into the melted portion of the Fe-based metallic member at the joining, and therefore, a shape that the joining layer is fitted to the Fe-based metallic member can be obtained. Furthermore, laser multiply reflects in the key hole. Therefore, energy density is high, and the surface temperature in the key hole can be maintained uniformly. This can uniformly form a metal compound layer containing the Al—Fe—Zn system intermetallic compound over the upper portion, the central portion and the lower portion of the joint part. As a result, strength at the joint part between the Fe-based metallic member and the joining layer can further be increased, and consequently, joint strength between the Fe-based metallic member and the Al-based metallic member can further be improved.

According to one or more examples of the present invention, in the joint structure in which the Fe-based metallic member containing the Fe-based material and the Al-based metallic member containing the Al-based material are joined by interposing the joining layer containing Zn as a main component therebetween, the joining layer contains Al, and an intermetallic compound layer containing an Al—Fe—Zn system intermetallic compound, whose main component is Al, is formed in the interface part between the Fe-based metallic member and the joining layer. Various constitutions can be used in the joint structure of the metallic members according to the above examples. For example, the joint structure can have a shape in which the joining layer is fitted to the Fe-based metallic member.

According to the method for joining metallic members or the joint structure according to the above examples, the intermetallic compound layer containing the Al—Fe—Zn-based intermetallic compound, whose main component is Al, can be formed in the interface part between the Fe-based metallic member and the joining layer containing the Zn-based filler metal. Furthermore, the intermetallic compound layer has high ductility, and therefore, the effect that can increase joint strength between the Fe-based metallic member and the joining layer can be obtained.

One or more examples of the present invention provide a filler metal that can obtain strength of nearly the same degree as that of a joint structure of similar metallic members in the joint structure of dissimilar metallic members, and a method for joining metallic members using the filler metal.

The present inventors made keen investigations to a filler metal applied to the joining of dissimilar metals using the Fe-based metallic member and the Al-based metallic member as metallic members. Conventionally, in the case of adding Si to Zn, a melting point of the resulting material increases with the addition of Si, and becomes high as about 600 to 900° C., as shown in FIG. 18(A). For this reason, Si was not investigated as an additive element of a filler metal. An element generally used as an additive element of the Zn-based filler metal is Al, which decreases a melting point of the filler metal by the formation of an eutectic alloy with Zn, as shown in FIG. 18(B). FIG. 18(A) is a Zn—Si system binary equilibrium diagram, and FIG. 18(B) is a Zn—Al system binary equilibrium diagram (Source: Binary Alloy Phase Diagrams, ASM International, Materials Park).

On the other hand, the present inventors have found that an intermetallic compound layer is not formed in the interface part between the Fe-based metallic member and the joining layer by using a Zn—Si-based brazing filler metal containing Si as an additive element.

According to one or more examples of the present invention, the filler metal is a filler metal used to join the Fe-based metallic member containing the Fe-based material and the Al-based metallic member containing an Al-based material, and comprises Zn, Si and unavoidable impurities.

The joining of dissimilar metallic members of the Fe-based metallic member containing the Fe-based material and the Al-based metallic member comprising an Al-based material is conducted by using the Zn—Si-based filler metal containing Si as the additive element, and therefore, an intermetallic compound layer is not formed in the interface part between the Fe-based metallic member and the joining layer. In the case that the intermetallic compound layer in the interface part between the Fe-based metallic member and the joining layer is brittle, the joint structure strength was decreased. However, such an intermetallic compound layer is not formed by using the Zn—Si-based filler metal, and therefore, strength of the interface part between the Fe-based metallic member and the joining layer can be increased. As a result, joint strength nearly the same as that of the joining of similar metallic members can be obtained.

The filler metal of the above examples can use various constitutions. For example, the filler metal can contain 0.25 to 2.5% by weight of Si, and the remainder being Zn and unavoidable impurities. This embodiment can further improve joint strength (particularly, peel strength).

According to one or more examples of the present invention, the method for joining metallic members is a method for joining the Fe-based metallic member containing the Fe-based material and the Al-based metallic member containing the Al-based material by interposing the filler metal between the Fe-based metallic member and the Al-based metallic member. The filler metal contains Zn, Si and unavoidable impurities.

According to one or more examples of the present invention, various constitutions can be used in the method for joining metallic members. For example, the Fe-based metallic member in the joined part can be heated at a temperature higher than a melting point of the Fe-based material. In this embodiment, the joined part of the Fe-based metallic member contains the Fe-based material can be heated at a temperature higher than a melting point of the Fe-based material, and therefore, the key hole can be formed in the joined part of the Fe-based metallic member at the joining. The "key hole" used herein means a hollow portion formed by melting a metallic member. The term "joined part" used herein means a predetermined joint part between the Fe-based metallic member before joining and the Al-based metallic member, and the term "joint part" used herein means a predetermined joint part after joining.

In the heating by laser irradiation, laser beam multiply reflects in the key hole. Therefore, energy density is increased in the key hole, and the entire surface from upper side to the lower side in the key hole is heated nearly uniformly. By this, after heating the joined part, a molten Zn—Si-based filler metal entered the key hole can uniformly react with the entire surface in the key hole. Therefore, strength in the interface part between the Fe-based metallic member and the joining layer can further be increased, and consequently, joint strength of a joined structure can be further improved.

The Zn-based material and the Fe—Zn-based material vaporize. By this, a plated portion plated on the Fe-based material vaporizes regardless of the kinds of plating such as GA plating or GI plating, and as a result, good joint part can be obtained regardless of the kind of the plating. Furthermore, an oxide coating film on the surface of the Fe-based material is removed by vapor pressure in the melting and the vaporization due to overheating. Therefore, even though flux is not used, joining of good dissimilar metallic members can be conducted well.

According to the filler metal or the method for joining metallic members using the same, according to one or examples of the present invention, a brittle intermetallic compound layer is not formed in the interface part between the Fe-based metallic member and the joining layer. Therefore, strength of the interface part between the Fe-based metallic member and the joining layer can be improved, and as a result, the resulting joined structure can obtain the effect that can obtain joint strength as nearly the same as that in the joining of similar metallic members.

One or more examples of the present invention provide a method for joining metallic members, that can improve joint strength by preventing generation of thermal history every site in the interface part of the joined part of dissimilar metallic members.

According to one or more examples of the present invention, in the method for joining plural metallic members by the filler metal using laser beam as a heat source, the Fe-based metallic member containing the Fe-based material and the Al-based metallic member containing the Al-based material are used as metallic members, and the Zn-based filler metal is used as a filler metal. In the joining of the Fe-based metallic member and the Al-based metallic member, the filler metal is vaporized by the irradiation with laser beam, the joined part of metallic members is melted to form a key hole, and laser beam multiply reflects in the key hole. The "key hole" used herein means a hollow portion formed by melting a metallic member. The term "joined part" used herein means a predetermined joint part between the Fe-based metallic member and the Al-based metallic member before joining, and the term "joint part" used herein means a predetermined joint part after joining.

In the joining method of the above examples, the filler metal is vaporized by the irradiation of laser beam, the welded part of the metallic member is melted, and the key hole is formed. During heating the welded part, the vaporized filler metal fills the key hole, and the remaining filler metal is present on the periphery of the upper end portion of the key hole together with the molten metal. After heating the welded part, those molten materials enter the key hole, and form a reaction layer.

During heating the welded part, the laser beam multiply reflects in the key hole. Therefore, energy density is increased in the key hole, and the entire surface from the upper side to the lower side in the key hole is nearly uniformly heated. By this, after heating the welded part, the molten material entering the key hole can uniformly react with the entire surface in the key hole. Furthermore, the joining at low temperature is possible, and the molten material entering the key hole can instantly be coagulated. As a result, the interface part between the Fe-based metallic member and the joining layer can uniformly be cooled.

Therefore, in the case that the reaction layer is formed between the Fe-based metallic member and the joining layer, the reaction layer has an uniform layer shape, and joint strength can be improved. Furthermore, in the case that the reaction layer is not formed between the Fe-based metallic member and the joining layer, such a brittle layer is not present, and additionally unevenness is not generated in strength distribution in the interface part between the Fe-based metallic member and the joining layer. As a result, joint strength can greatly be improved.

When a key hole is formed, joining area is increased. Therefore, the above effect can well be obtained. Zn-based plating and alloyed Fe—Zn-based plating vaporize. In this case, plated portion plated on the Fe-based material vaporizes regardless of the kinds of plating such as GA plating or GI plating. As a result, good joint part can be obtained regardless of the kinds of plating. Furthermore, an oxide coating film on the surface of the Fe-based material is removed by vapor pressure in the melting and the vaporization due to overheating. Therefore, even though flux is not used, joining of dissimilar metallic members can well be conducted.

In the joining of dissimilar metallic members, the region of the joining temperature is limited to a predetermined region unlike the case of similar metallic members. Therefore, the method for joining metallic members according to the above examples in which the entire surface from the upper side to the lower side in the key hole can uniformly be heated is particularly effective to the joining of dissimilar metallic members in which the region of the joining temperature is limited to the predetermined region. The effect by this is remarkable as compared with the conventional joining of dissimilar metallic members.

According to one or more examples of the present invention, in the method for joining plural metallic members by the filler metal using laser beam as a heat source, the Fe-based metallic member containing the Fe-based material and the Al-based metallic member containing the Al-based material are used as the metallic members, the Zn-based filler metal is used as the filler metal, and a groove shape is formed by the Fe-based metallic member and the Al-based metallic member. In the joining of the Fe-based metallic member and the Al-based metallic member, the filler metal is vaporized by the irradiation with laser beam, and laser beam multiply reflects on the surface of the groove shape.

In the method for joining metallic members according to the above examples, in place of conducting multiple reflection of laser beam in the key hole formed by melting the welded part of the metallic members, the welded parts of the metallic members are not melted, and multiple reflection of laser beam is conducted in the groove shape formed by the Fe-based metallic member and the Al-based metallic member. By conducting multiple reflection of laser beam on the surface of the groove shape formed by the Fe-based metallic member and the Al-based metallic member, the entire surface of the groove shape can nearly uniformly be heated. As a result, the above effect by the multiple reflection can be obtained.

According to the method for joining metallic members according to the above examples, the multiple reflection of laser beam is conducted in the key hole or on the surface of the groove shape, and therefore, the entire surface can nearly uniformly be heated. As a result, the effect that the joint strength in the interface part between the Fe-based metallic member and the joining layer can be improved can be obtained.

Other characteristic and effects are apparent from the description of Examples and the claims attached.

BRIEF DESCRIPTION OF THE DRAWINGS

FIG. 1(A) is a schematic perspective view, and FIG. 1(B) is a side view of a joined part.

FIG. 2(A) is an enlarged front view in the case that the center line of laser beam consists with the center line of a groove shape of metallic members, and FIG. 2(B) is an enlarged front view in the case that the center line of laser beam shifts to the Fe-based metallic member side from the center line of the groove shape of metallic members.

FIG. 4(A) is a whole photograph of the joint part and its neighborhood, FIG. 4(B) is a photograph of an upper portion in a joined interface part between an Fe-based metallic member and a joining layer, FIG. 4(C) is a photograph of a central portion in a joined interface part between an Fe-based metallic member and a joining layer, and FIG. 4(D) is a photograph of a lower portion of a joined interface part between an Fe-based metallic member and a joining layer.

FIG. 5(A) is a whole photograph of the joint part and its neighborhood, FIG. 5(B) is a photograph of an upper portion of a joined interface part between an Fe-based metallic member and a joining layer, FIG. 5(C) is a photograph of a central portion of a joined interface part between an Fe-based metallic member and a joining layer, and FIG. 5(D) is a photograph of a lower portion of a joined interface part between an Fe-based metallic member and a joining layer.

FIG. 6(A) is a whole photograph of the joint part and its neighborhood, FIG. 6(B) is a photograph of an upper portion of a joined interface part between an Fe-based metallic member and a joining layer, FIG. 6(C) is a photograph of a central portion of a joined interface part between an Fe-based metallic member and a joining layer, and FIG. 6(D) is a photograph of a lower portion of a joined interface part between an Fe-based metallic member and a joining layer.

FIG. 7(A) is a whole photograph of the joint part and its neighborhood, FIG. 7(B) is a photograph of an upper portion of a joined interface part between an Fe-based metallic member and a joining layer, FIG. 7(C) is a photograph of a central portion of a joined interface part between an Fe-based metallic member and a joining layer, and FIG. 7(D) is a photograph of a lower portion of a joined interface part between an Fe-based metallic member and a joining layer.

FIG. 8(A) is a whole photograph of the joint part and its neighborhood, FIG. 8(B) is a photograph of an upper portion of a joined interface part between an Fe-based metallic member and a joining layer, FIG. 8(C) is a photograph of a central portion of a joined interface part between an Fe-based metallic member and a joining layer, and FIG. 8(D) is a photograph of a lower portion of a joined interface part between an Fe-based metallic member and a joining layer.

FIG. 9(A) is a whole photograph of the joint part and its neighborhood, FIG. 9(B) is a photograph of an upper portion of a joined interface part between an Fe-based metallic member and a joining layer, FIG. 9(C) is a photograph of a central portion of a joined interface part between an Fe-based metallic member and a joining layer, and FIG. 9(D) is a photograph of a lower portion of a joined interface part between an Fe-based metallic member and a joining layer.

FIG. 10(A) is a schematic perspective view, and FIG. 10(B) is a side view.

FIG. 14(A) is SEM photograph of 3,000 magnifications, and FIG. 14(B) is SEM photograph of 15,000 magnifications.

FIG. 19(A) is a perspective view, and FIG. 19(B) is a view seen from an Al-based metallic member in FIG. 19(A).

FIGS. 20(A) to 20(D) are schematic views seen from the same direction as in FIG. 19(B) in each step.

FIGS. 21(A) to 21(D) are schematic views seen from the front of FIG. 19(A) in each step.

FIGS. 23(A) to 23(D) are schematic views seen from the front of FIG. 19(A) in each step.

FIG. 25(A) is a whole photograph of the joint part and its neighborhood, FIG. 25(B) is a photograph of an upper portion of a joined interface part between an Fe-based metallic member and a joining layer, FIG. 25(C) is a photograph of a central portion of a joined interface part between an Fe-based metallic member and a joining layer, and FIG. 25(D) is a photograph of a lower portion of a joined interface part between an Fe-based metallic member and a joining layer.

FIG. 26(A) is a whole photograph of the joint part and its neighborhood, FIG. 26(B) is a photograph of an upper portion of a joined interface part between an Fe-based metallic member and a joining layer, FIG. 26(C) is a photograph of a central portion of a joined interface part between an Fe-based metallic member and a joining layer, and FIG. 26(D) is a photograph of a lower portion of a joined interface part between an Fe-based metallic member and a joining layer.

FIG. 27(A) is a whole photograph of a joint part and its neighborhood, FIG. 27(B) is a photograph of an upper portion of a joined interface part between an Fe-based metallic member and a joining layer, FIG. 27(C) is a photograph of a central portion of a joined interface part between an Fe-based metallic member and a joining layer, and FIG. 27(D) is a photograph of a lower portion of a joined interface part between an Fe-based metallic member and a joining layer.

FIG. 29(A) is SEM photograph of 3,000 magnifications, and FIG. 29(B) is SEM photograph of 15,000 magnifications.

MODE FOR CARRYING OUT THE INVENTION

<First Embodiment>

Figure 1:
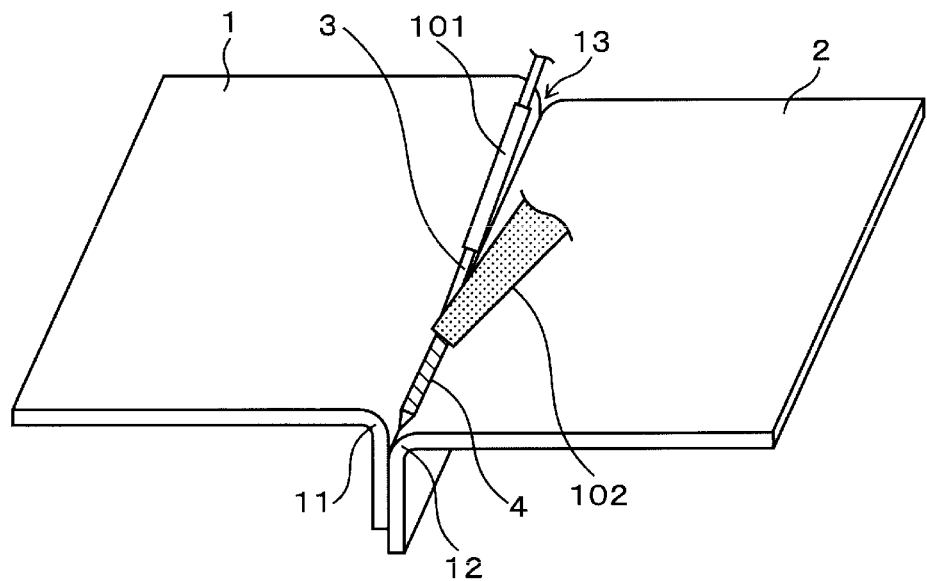
FIG. 1(A) and FIG. 1(B) show the state of producing a joined structure by a method for joining metallic members according to a first embodiment.
Figure 1:
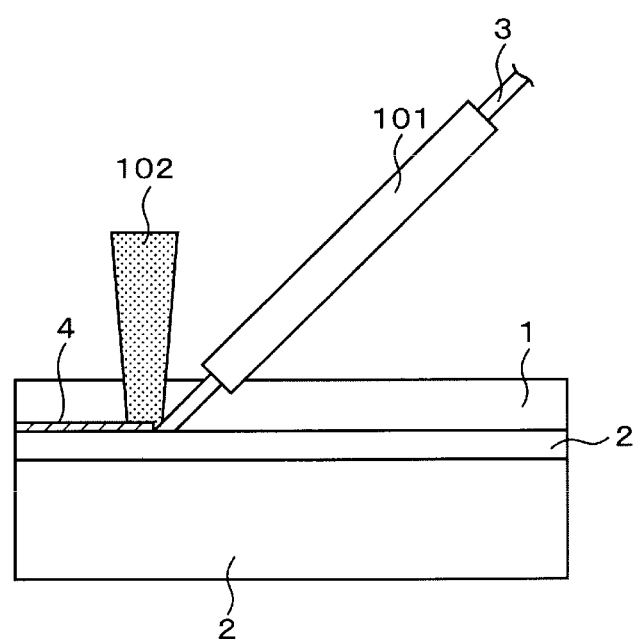

A first embodiment of the present invention is described below by referring to the Drawings. FIG. 1(A) and FIG. 1(B) show the state that joining is conducted using a method for joining metallic members according to the first embodiment. FIG. 1(A) is a schematic perspective view, and FIG. 1(B) is a schematic front view. FIG. 2(A) and FIG. 2(B) show an example of irradiation state of laser beam to a joined part of metallic members in FIG. 1(A) and FIG. 1(B). FIG. 2(A) is an enlarged front view in the case that the center line of laser beam corresponds to the center line of a groove shape of metallic members, and FIG. 2(B) is an enlarged front view in the case that the center line of laser beam shifts to an Fe-based metallic member side from the centerline of the groove shape of metallic members.

The method for joining metallic members uses an arrangement for producing, for example, a flare joint. The Fe-based metallic member 1 containing the Fe-based material and an Al-based metallic member 2 containing the Al-based material are used as the metallic members. The Fe-based metallic member 1 and the Al-based metallic member 2 have curved portions 11 and 12, respectively. In the arrangement of the Fe-based metallic member 1 and the Al-based metallic member 2, the curved portions 11 and 12 are faced with each other, and a groove shape 13 is formed by the curved portions 11 and 12. In this case, stepped portion is provided on a facing part between the Fe-based metallic member 1 and the Al-based metallic member 2.

In the method for joining metallic members according to the first embodiment, a wire-shaped Zn-based filler metal 3 is fed to the central portion of the groove shape 13 formed by the curved portions 11 and 12 of the Fe-based metallic member 1 and the Al-based metallic member 2 through a wire guide 101, and during feeding, a tip portion of the Zn-based filler metal 3 is irradiated with laser beam 102. The Zn-based filler metal 3 can be any filler metal so long as Zn is a main component, and may contain or may not contain Al. In the irradiation with the laser beam 102, the joined part of the Fe-based metallic member 1 is heated at a temperature higher than a melting point of the Fe-based material as its constituent material.

In this case, the center line I of the laser beam 102 may correspond to the center line of the groove shape 13 as shown in FIG. 2(A), but it is preferred that the center line I' of the laser beam 102 positions at the Fe-based metallic member 1 side from the center line of the groove shape 13 as shown in FIG. 2(B). "I" in FIG. 2(B) shows the center line of the laser beam in FIG. 2(A). The joined part of the Fe-based metallic member 1 is heated such that a key hole is formed in the Fe-based metallic member 1. In this case, a shielding gas is fed to the joined part, thereby shielding the joined part from the atmosphere.

Figure 2:
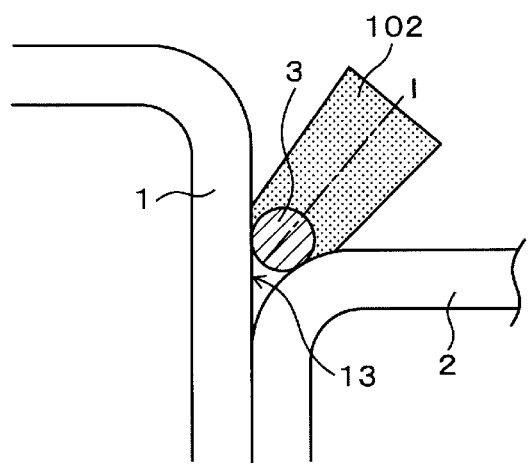
FIG. 2(A) and FIG. 2(B) show the example of irradiation state of laser beam to a joined part of metallic members in FIG. 1(A) and FIG. 1(B).
Figure 2:
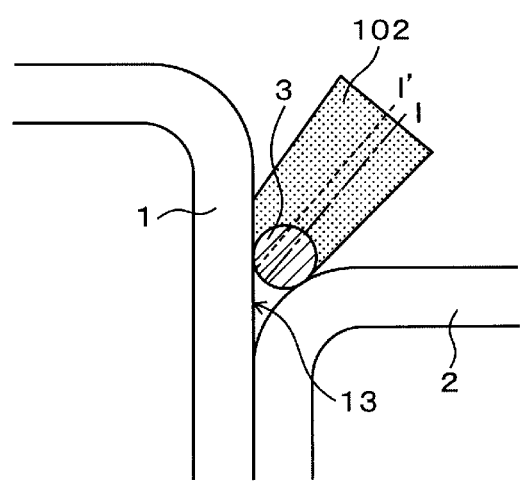
Figure 3:
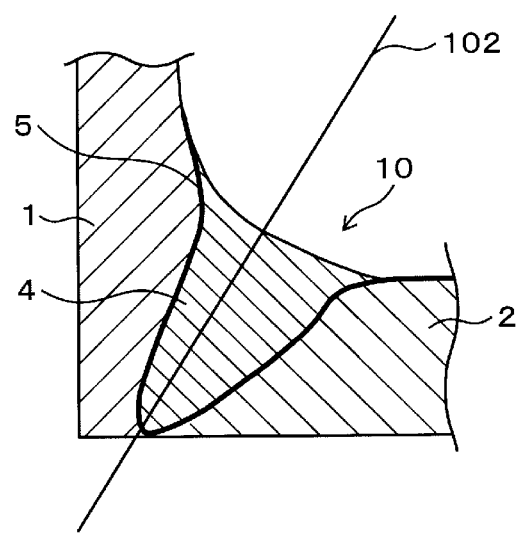
FIG. 3 is a block diagram showing the joined structure of metallic members according to the first embodiment.

The heating by the irradiation with the laser beam 102 is conducted from the near side to the far side in FIG. 1 along the extending direction of the groove shape 13. As a result, a joined structure 10 between the Fe-based metallic member 1 and the Al-based metallic member 2 can be produced as shown in FIG. 3. The path of the laser beam 102 irradiated at the joining is shown in FIG. 3.

The joined structure 10 is provided with the Fe-based metallic member 1 and the Al-based metallic member 2, and the joining layer 4 made of the Zn—Al-based material, containing Zn as a main component and Al, is formed between the Fe-based metallic member 1 and the Al-based metallic member 2. An intermetallic compound layer 5 containing an Al—Fe—Zn system intermetallic compound containing Al as a main component is formed in the interface part between the Fe-based metallic member 1 and the joining layer 4. The Al of the Al-based metallic member flows into the joining layer 4 by welding. Therefore, even in the case that the Zn-based filler metal 3 does not contain Al, the joining layer 4 and the intermetallic compound layer 5 contain Al. In this case, the intermetallic compound layer 5 is preferably formed along the entire interface of the interface part between the Fe-based metallic member 1 and joining layer 4. Furthermore, in order that the intermetallic compound layer 5 has a stable layer shape, its composition ratio is preferably Al: 40 to 60%, Fe: 30 to 40% and Zn: 10 to 25%. It is considered that the intermetallic compound layer 5 has the following actions and effects. That is, the intermetallic compound layer 5 has the action to suppress a reaction between Fe and Al, and it is presumed that this action prevents Al from flowing into the Fe-based metallic member 1 and Fe from flowing in the Al-based metallic member 2.

In the first embodiment, the joined part of the Fe-based metallic member 1 is heated at a temperature higher than a melting point of the Fe-based material at the joining. Therefore, the intermetallic compound layer 5 made of an Al—Fe—Zn system intermetallic compound containing Al as a main component can be formed in the interface part between the Fe-based metallic member 1 and the joining layer 4 containing the Zn-based filler metal 3. The intermetallic compound layer 5 has high ductility, and therefore can increase joint strength between the Fe-based metallic member 1 and the joining layer 4. Consequently, joint strength between the Fe-based metallic member 1 and the Al-based metallic member 2 can be improved. Furthermore, by the heating at a temperature higher than a melting point of the Fe-based material as described above, the Zn-based material and the Fe—Zn-based material vaporize. By this, the plated portion plated on the Fe-based material vaporizes regardless of the kinds of plating such as GA plating or GI plating. Consequently, good joint part can be obtained regardless of the kinds of plating. Furthermore, an oxide coating film on the surface of the Fe-based material is removed by vapor pressure in the melting and vaporization due to overheating. Therefore, even though flux is not used, good joining of dissimilar materials can be conducted.

Particularly, in the joining, the Fe-based material of the Fe-based metallic member 1 can selectively be melted by positioning the center line I' of the laser beam 102 at the Fe-based metallic member 1 side relative to the center line of the groove shape 13. As a result, the intermetallic compound layer 5 can be formed into a stable layer shape over the entire interface part between the Fe-based metallic member 1 and the joining layer 4. Furthermore, the Al-based material of the Al-based metallic member 2 is not excessively heated, and this can prevent the Al-based material from melting and dropping down. Therefore, joint strength between the Fe-based metallic member 1 and the Al-based metallic member 2 can further be improved.

At the joining, the joined part of the Fe-based metallic member 1 is heated such that the key hole is formed in the Fe-based metallic member 1. Therefore, the Zn-based filler metal 3 flows into the molten part of the Fe-based metallic member 1 at the joining. This makes it possible to obtain a shape that the joining layer 4 is fitted to the Fe-based metallic member 1. Laser multiply reflects in the key hole. Therefore, energy density is high and temperature on the surface in the key hole is maintained uniformly. This can uniformly form the intermetallic compound layer 5 over the upper portion, the central portion and the lower portion of the joint part. Therefore, joint strength between the Fe-based metallic member 1 and the joining layer 4 can further be improved, and consequently joint strength between the Fe-based metallic member 1 and the Al-based metallic member 2 can further be improved.

The first embodiment is described in further detail by referring to the specific examples.

In Examples 1 to 3 and Comparative Examples 1 to 3, two metallic members were arranged and a groove shape was formed by curved portions of those metallic members, as same as the arrangement embodiment shown in FIG. 1(A) and FIG. 1(B). A wire-shaped Zn-based filler metal was fed to a central portion of the groove shape through a wire guide, and while feeding, a tip portion of the Zn-based filler metal was irradiated with laser beam. Thus, a joined structure of metallic members was produced.

Joining conditions of Examples 1 and 2 and Comparative Examples 1 to 3 are shown in Table 1. Regarding the metallic member, the indication "Fe/Al" shows that a steel plate which is the Fe-based metallic member and an Al alloy plate which is the Al-based metallic member were used as two metallic members. The indication "Fe/Fe" shows that the steel plate which is the Fe-based metallic member was used as two metallic members. Regarding the material of the filler metal, "ZnAl" shows that a ZnAl-based filler metal (containing unavoidable impurities) having a composition ratio (wt %) of Zn:Al=96:4 was used, and "Zn" shows that a Zn-based filler metal (containing unavoidable impurities) in which Al is not contained and Zn is 100 wt % was used. Regarding the position of beam irradiation, the indication "Center" shows the arrangement that the center line of laser beam corresponds to the center line of the groove shape of two metallic members (the arrangement of FIG. 2(A)), and the indication "Fe-side" shows that the center line of laser beam shifts 0.6 mm to the Fe-based metallic member side from the center line of the groove shape (the arrangement of FIG. 2(B)).

TABLE 1

| | Combination of matrixes (Upper) Material of filler metal (Lower) | Heating state | Laser beam output (kw) | Wire feeding speed (m/min) | Irradiation position of laser beam | Joining speed (m/min) |
|---|---|---|---|---|---|---|
| Example 1 | Fe/Al ZnAl | Fe melted | 1.2 | 2.5 | Fe side | 1 |
| Example 2 | Fe/Al ZnAl | Fe melted | 1.2 | 2.5 | Center | 1 |
| Example 3 | Fe/Al Zn | Fe melted | 1.2 | 2.5 | Fe side | 1 |
| Comparative Example 1 | Fe/Al ZnAl | Fe not melted | 1 | 2 | Center | 1 |
| Comparative Example 2 | Fe/Al ZnAl | Fe melted | 1.6 | 2 | Center | 1 |
| Comparative Example 3 | Fe/Fe ZnAl | Fe melted | 1.2 | 2.5 | Fe side | 1 |

Regarding other common joining conditions of Examples 1 to 3 and Comparative Examples 1 to 3, a size of two metallic members was that a length in horizontal direction in FIG. 1 is 82 mm and a length in longitudinal direction in FIG. 1 is 200 mm, and a height of the stepped portion at the joined part of two metallic members was 5 mm. Ar gas was used as a shielding gas, and its feed amount was 25 liters/min. Irradiation angle of laser beam was 40°.

Regarding the thus-obtained joined structures of the metallic members of Examples 1 to 3 and Comparative Examples 1 to 3, the state of the joint part and its neighborhood was observed using a scanning electron microscope (SEM), and a composition ratio (atm %) of the joint part and its neighborhood was obtained using an energy dispersion X-ray analyzer (EDX analyzer). Then, joint strength of the joined structures of Examples 1 to 3 and Comparative Examples 1 to 3 was obtained. The results are shown in FIGS. 4 to 9 and Table 2.

FIGS. 4 to 9 are SEM photographs of the joined structures of metallic members of Examples 1 to 3 and Comparative Examples 1 to 3. In each drawing, (A) is a whole photograph of the joint part and its neighborhood, (B) is a photograph of an upper portion P of a joined interface part between the Fe-based metallic member and the joining layer in (A), (C) is a photograph of a central portion Q in a joined interface part between the Fe-based metallic member and the joining layer, and (D) is a photograph of a lower portion R of a joined interface part between the Fe-based metallic member and the joining layer. In Table 2, regarding the judgment of strength, strength of the Al-based metallic member itself used in the Examples and the Comparative Examples is about 240 N/mm, and joint strength between the Al-based metallic members is about 140 N/mm. Therefore, in the case that joint strength in each of the Examples and the Comparative Examples is about 140 N/mm or more, its strength was indicated as Good: A. The mark "A" in the evaluation means "Good", "B" means "Problem", and "C" means "Poor".

Figure 4:
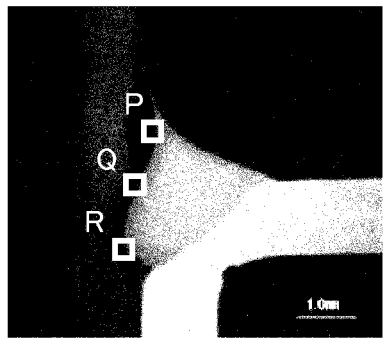
FIGS. 4(A) to 4(D) are SEM photographs of the joined structure of metallic members of Example 1 according to the first embodiment.
Figure 4:
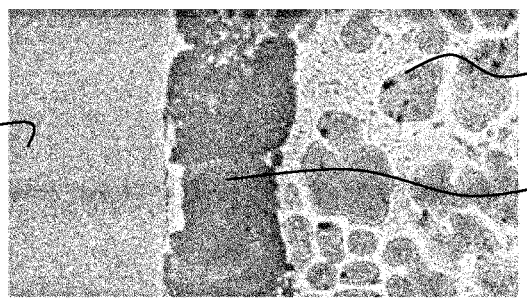
Figure 4:
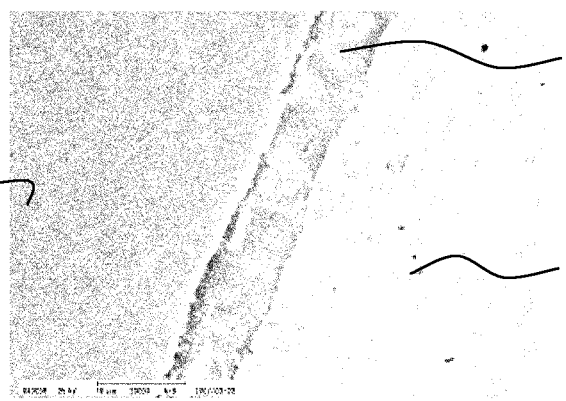
Figure 4:

In the joining of Example 1, as shown in Table 1, a Fe-based metallic member and an Al-based metallic member were used as two metallic members, and appropriate heat input conditions in which a joined part of the Fe-based metallic member is appropriately melted by heating were employed. In the laser beam irradiation, the center line of laser beam was shifted 0.6 mm to the Fe-based metallic member side from the center line of a groove shape of two metallic members. In the joined structure of Example 1 obtained by the joining conditions, as shown in FIG. 4 and Table 2, the intermetallic compound layer made of the Al—Fe—Zn system intermetallic compound having a stable layer shape was formed in all of the upper portion P, the central portion Q and the lower portion R of the joined interface part between the Fe-based metallic member and the joining layer, and the layer was mostly occupied by a compound having a composition ratio of Al:Fe:Zn=52:29:19 (about 5:3:2). The composition ratio obtained by SEM analysis was Al:Fe::30:13. Joint strength of the joined structure of Example 1 was 154 N/mm.

Figure 5:
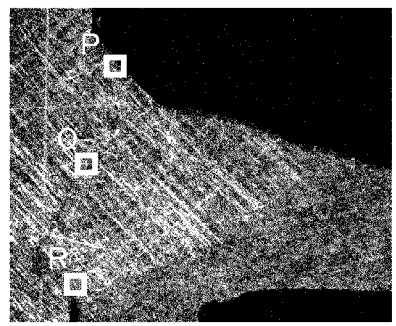
FIGS. 5(A) to 5(D) are SEM photographs of the joined structure of metallic members of Example 2 according to the first embodiment.
Figure 5:
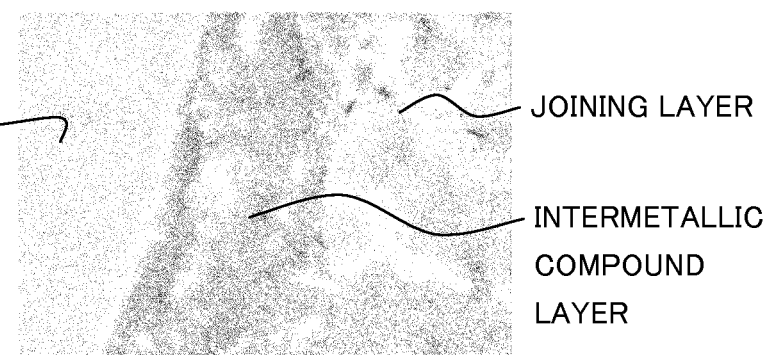
Figure 5:
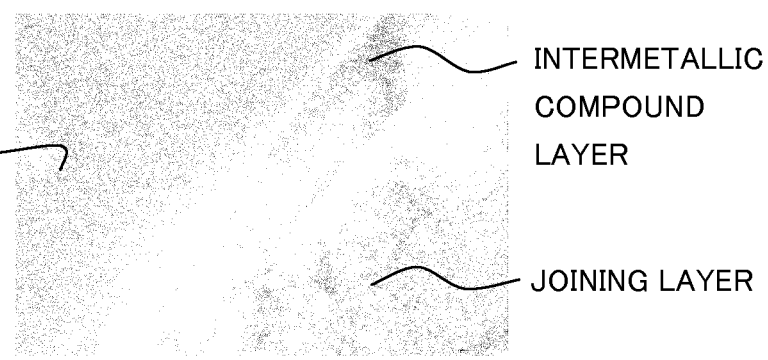
Figure 5:
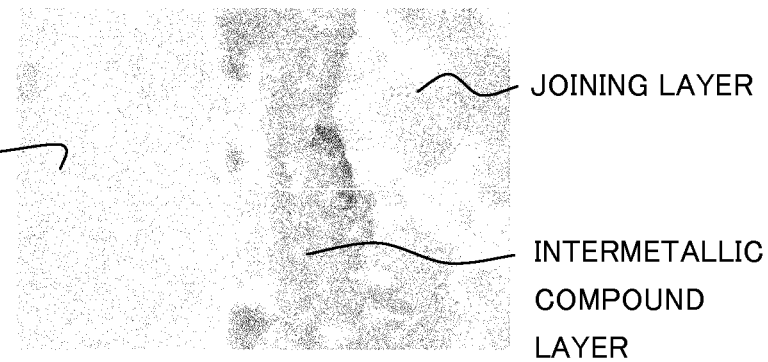

In the joining of Example 2, as shown in Table 1, a Fe-based metallic member and an Al-based metallic member were used as two metallic members, and appropriate heat input conditions in which a joined part of the Fe-based metallic member is appropriately melted by heating were employed. In the laser beam irradiation, the center line of laser beam corresponded to the center line of a groove shape of two metallic members. In the joined structure of Example 2 obtained by the joining conditions, as shown in FIG. 5 and Table 2, the boundary surface between the intermetallic compound layer made of the Al—Fe—Zn system intermetallic compound and the joining layer was unclear in the upper portion P and the lower portion R of the joined interface part between the Fe-based metallic member and the joining layer as compared with the joined structure of Example 1, but the intermetallic compound layer made of the Al—Fe—Zn system intermetallic compound having a stable layer shape was formed in the central portion Q of the joined interface part between the Fe-based metallic member and the joining layer. The intermetallic compound layer was mostly occupied by a compound having a composition ratio of Al:Fe:Zn=41:40:19. Joint strength of the joined structure of Example 2 was 96 N/mm.

In the joining of Example 3, as shown in Table 1, joining conditions were set to the same joining condition as in Example 1, except for using an Al-free Zn-based filler metal as a filler metal, and laser beam irradiation was conducted. In a joined structure of Example 3 obtained by the joining con-

TABLE 2

State of joined interface part (intermetallic compound layer) between Fe-based metallic member and joining layer

Figure 6:
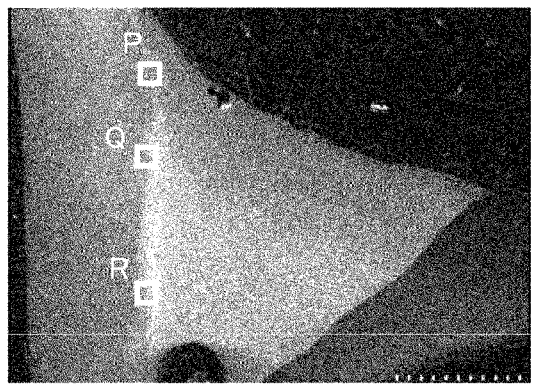
FIGS. 6(A) to 6(D) are SEM photographs of the joined structure of metallic members of Example 3 according to the first embodiment.
Figure 6:
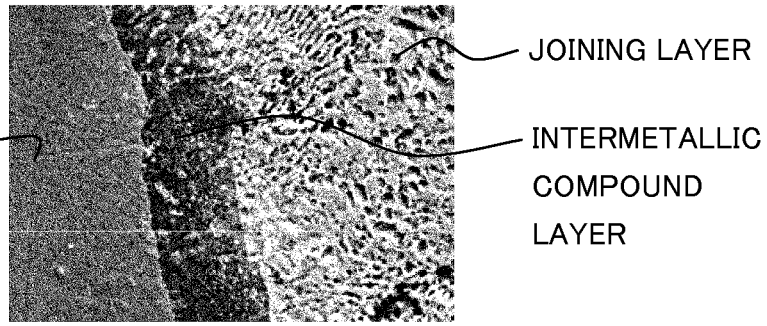
Figure 6:
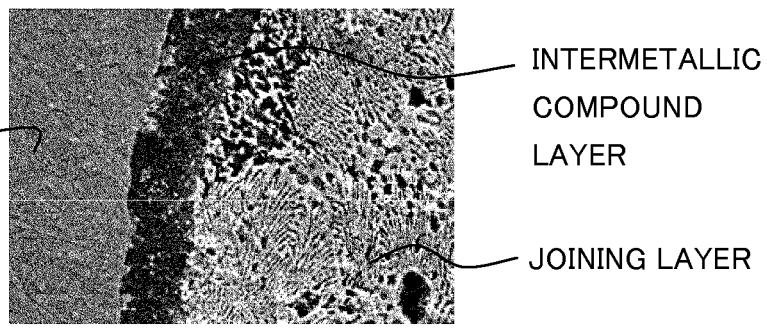
Figure 6:
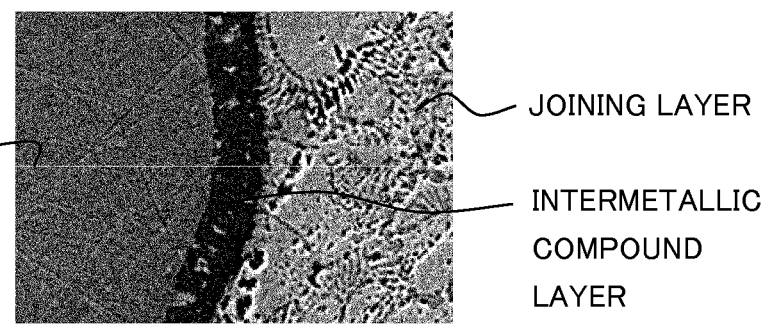

| | Site | State of joined interface | | Al (atm %) | Fe (atm %) | Zn (atm %) | Joint strength (N/mm) | Judgment of strength |
|---|---|---|---|---|---|---|---|---|
| Example 1 | Upper | Stable layer shape | A | 52 | 29 | 19 | 154 | A |
| | Central | Stable layer shape | A | 52 | 29 | 19 | | |
| | Lower | Stable layer shape | A | 52 | 29 | 19 | | |
| Example 2 | Upper | Layer shape having unclear boundary | B | 37 | 46 | 17 | 96 | C |
| | Central | Stable layer shape | A | 41 | 40 | 19 | | |
| | Lower | Layer shape having unclear boundary | B | 18 | 19 | 63 | | |
| Example 3 | Upper | Stable layer shape | A | 60 | 21 | 19 | 149 | A |
| | Central | Stable layer shape | A | 58 | 23 | 19 | | |
| | Lower | Stable layer shape | A | 61 | 28 | 9 | | |
| Comparative Example 1 | Upper | Stable layer shape | A | 40 | 37 | 23 | 37 | C |
| | Central | Layer shape having unclear boundary | B | 25 | 35 | 40 | | |
| | Lower | No intermetallic compound layer | C | None | None | None | | |
| Comparative Example 2 | Upper | Dendrite shape (No boundary surface) | C | 48 | 30 | 22 | 30 | C |
| | Central | Dendrite shape (No boundary surface) | C | 59 | 26 | 15 | | |
| | Lower | Mottled shape | C | 30 | 9 | 61 | | |
| Comparative Example 3 | Upper | Mottled shape | C | 70 | 15 | 15 | 56 | C |
| | Central | Mottled shape | C | 65 | 15 | 20 | | |
| | Lower | Meander shape | C | 70 | 20 | 10 | | | ditions, as shown in FIG. 6 and Table 2, the intermetallic compound layer made of the Al—Fe—Zn system intermetallic compound having a stable layer shape was formed in all of the upper portion P, the central portion Q and the lower portion R of the joined interface part between the Fe-based metallic member and the joining layer, and the layer was mostly occupied by a compound having a composition ratio of Al:Fe:Zn=58:23:19. Joint strength of the joined structure of Example 3 was 149 N/mm.

Figure 7:
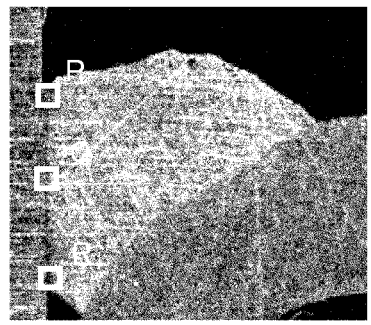
FIGS. 7(A) to 7(D) are SEM photographs of the joined structure of metallic members of Comparative Example 1.
Figure 7:
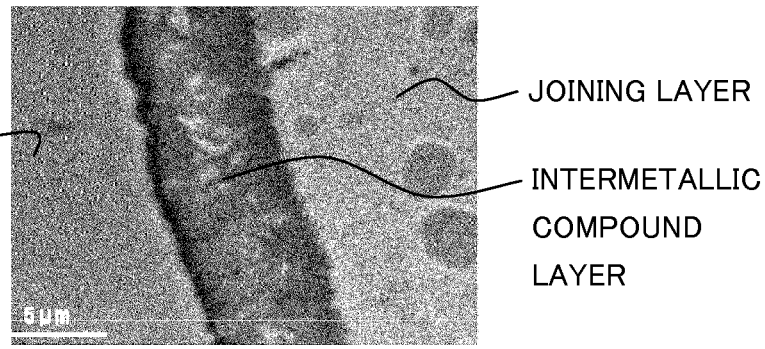
Figure 7:
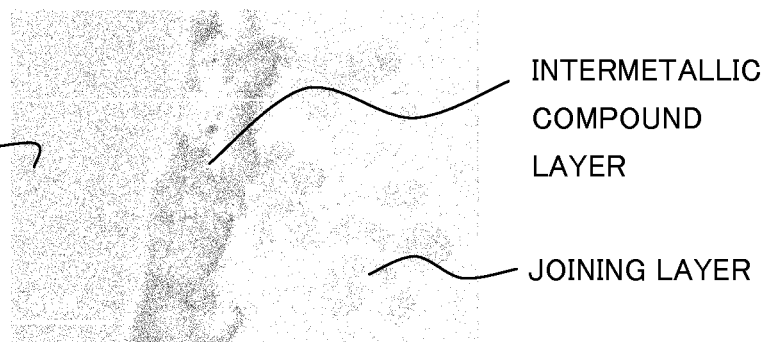
Figure 7:
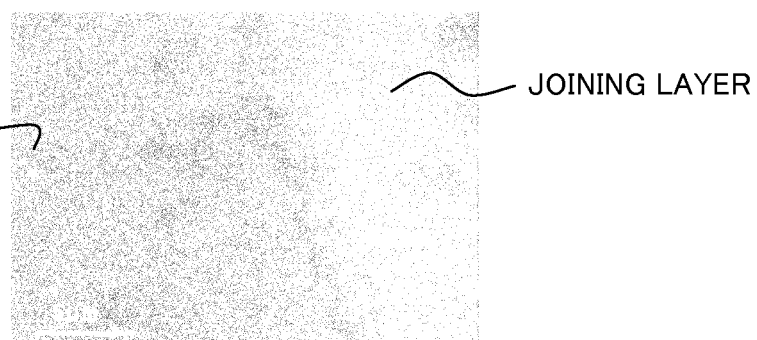

In the joining of Comparative Example 1, as shown in Table 1, a Fe-based metallic member and an Al-based metallic member were used as two metallic members, insufficient heat input conditions in which a joined part of the Fe-based metallic member is not melted by heating were employed, and in the laser beam irradiation, the center line of laser beam corresponded to the center line of a groove shape of two metallic members. In the joined structure of Comparative Example 1 obtained by the joining conditions, as shown in FIG. 7 and Table 2, the intermetallic compound layer made of the Al—Fe—Zn system intermetallic compound having a stable layer shape was formed in the upper portion P of the joined interface part between the Fe-based metallic member and the joining layer. However, the boundary surface between the intermetallic compound layer made of the Al—Fe—Zn-based intermetallic compound and the joining layer was unclear in the central portion Q of the joined interface part between the Fe-based metallic member and the joining layer, and an intermetallic compound layer was not formed in the lower portion R of the joined interface part. Joint strength of the joined structure of Comparative Example 1 was 37 N/mm.

Figure 8:
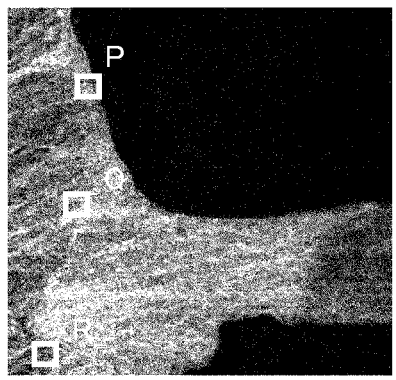
FIGS. 8(A) to 8(D) are SEM photographs of the joined structure to metallic members of Comparative Example 2.
Figure 8:
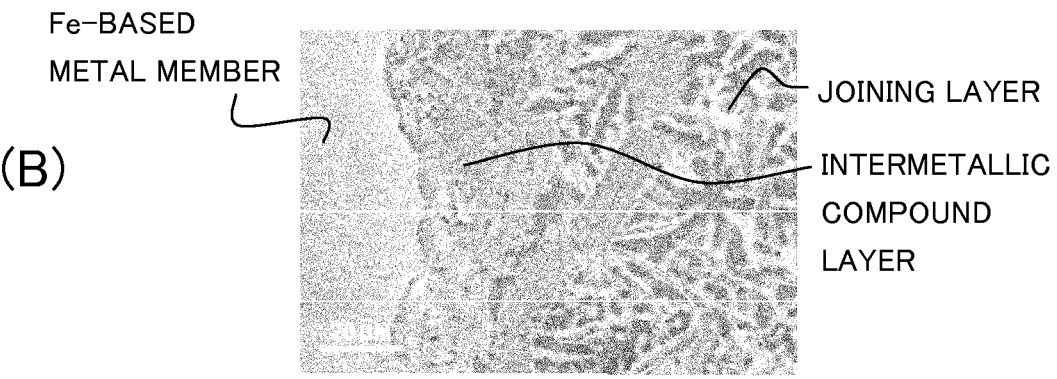
Figure 8:
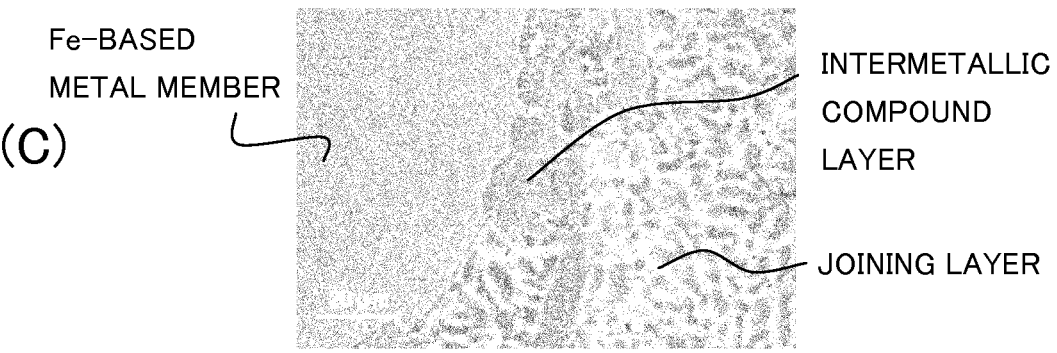
Figure 8:
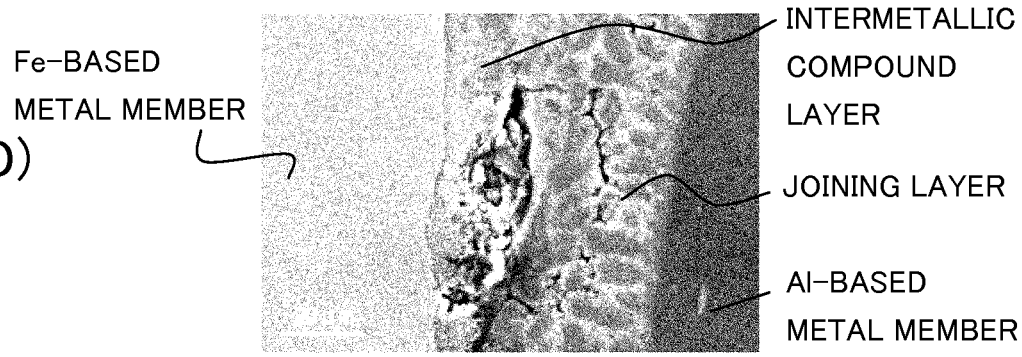

In the joining of Comparative Example 2, as shown in Table 1, a Fe-based metallic member and an Al-based metallic member were used as two metallic members, excessive heat input conditions in which a joined part of the Fe-based metallic member is melted by excessively heating were employed, and in the laser beam irradiation, the center line of laser beam corresponded to the center line of a groove shape of two metallic members. In the joined structure of Comparative Example 2 obtained by the joining conditions, as shown in FIG. 8 and Table 2, the intermetallic compound layer made of the intermetallic compound containing Al, Fe and Zn was formed in the upper portion P, the central portion Q and the lower portion R of the joined interface part between the Fe-based metallic member and the joining layer. The intermetallic compound layer had a dendrite shape (no boundary surface) in the upper portion P, and a mottled shape (no boundary surface at joining layer side) in the central portion Q4 and the lower portion R. Joint strength of the joined structure of Comparative Example 2 was 30 N/mm.

Figure 9:
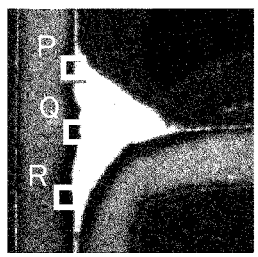
FIGS. 9(A) to 9(D) are SEM photographs of the joined structure of metallic members of Comparative Example 3.
Figure 9:
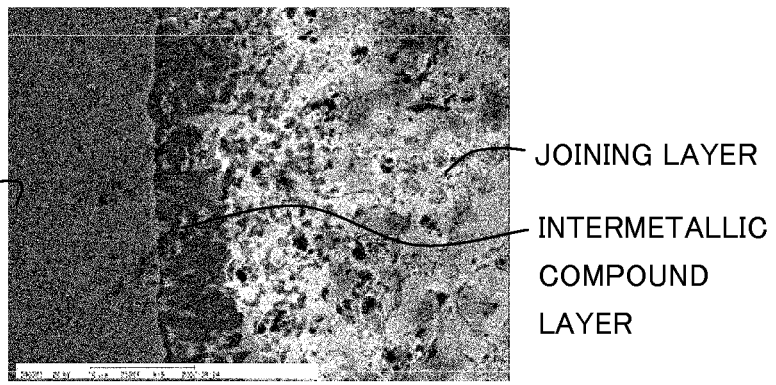
Figure 9:
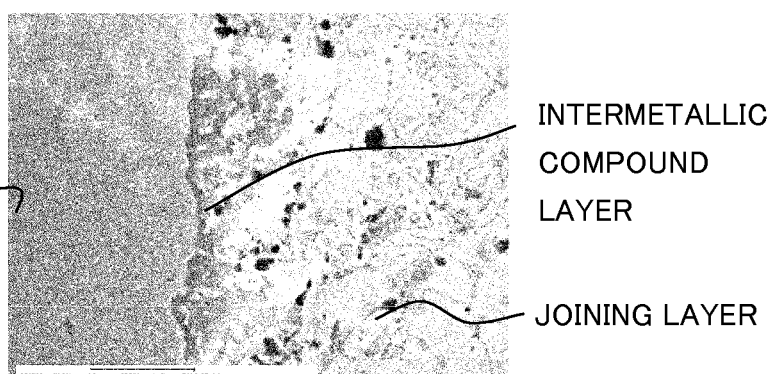
Figure 9:
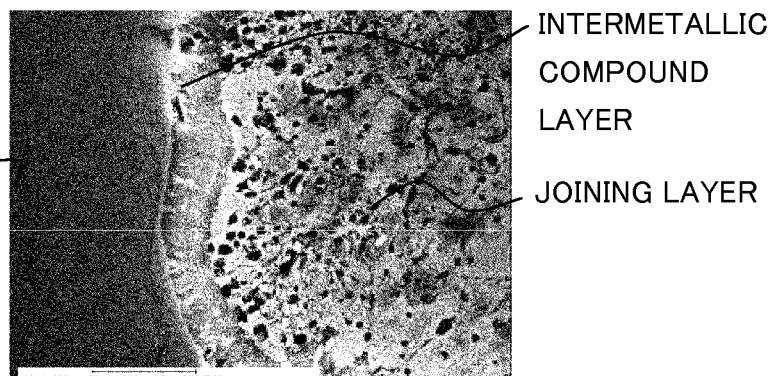

In the joining of Comparative Example 3, as shown in Table 1, a Fe-based metallic member was used as both of two metallic members, appropriate heat input conditions in which the joined part of the Fe-based metallic member is melted by appropriately heating were employed, and in the laser beam irradiation, the center line of laser beam was shifted 0.6 mm to the Fe-based metallic member side from the center line of a groove shape of two metallic members. In the joined structure of Comparative Example 3 obtained by the joining conditions, as shown in FIG. 9 and Table 2, the intermetallic compound layer made of the intermetallic compound containing Al, Fe and Zn was formed in the upper portion P, the central portion Q and the lower portion R of the joined interface part between the Fe-based metallic member and the joining layer. The intermetallic compound layer had a mottled shape (no boundary surface at joining layer side) in the upper portion P and the central portion Q, and a meander shape in the lower portion R. Joint strength of the joined structure of Comparative Example 3 was 56 N/mm.

As described above, in the joined structures of Examples 1 to 3, it was confirmed that by using the Fe-based metallic member and the Al-based metallic member as metallic members and using the heat input conditions in which Fe is appropriately melted, the intermetallic compound layer made of the Al—Fe—Zn system intermetallic compound can be formed in all of the upper portion P to the lower portion R of the joined interface part between the Fe-based metallic member and the joining layer and joint strength can be improved, as compared with the joined structures of Comparative Examples 1 to 3. It was further confirmed that the intermetallic compound layer has a stable layer shape regardless of the presence or absence of Al in the Zn-based filler metal. In the case that the intermetallic compound layer has a stable layer shape, it was confirmed that its composition ratio is satisfied with Al: 40 to 60%, Fe: 30 to 40% and Zn: 10 to 25%.

Particularly, it was confirmed in the joined structures of Examples 1 and 3 that by shifting the irradiation position of laser beam to the Fe-based metallic member side from the center line of the groove shape, the Al—Fe—Zn system intermetallic compound layer having a stable layer shape can be formed in all of the upper portion to the lower portion of the joined interface part between the Fe-based metallic member and the joining layer and joint strength can be improved, as compared with the joined structure of Example 2. It was further confirmed that the boundary between the Fe-based metallic member and the joining layer and the boundary between the Al-based metallic member and the joining member become clear as the intermetallic compound layer becomes a stable layer shape. It was understood from this fact that the intermetallic compound layer has the action to suppress a reaction between Fe and Al and the action can prevent Al from flowing into the Fe-based metallic member and Fe from flowing into the Al-based metallic member.

<Second Embodiment>

A second embodiment of the present invention is described below by referring to the drawings. FIGS. 10(A) and 10(B) show a schematic constitution of the state that joining is conducted using a method for joining metallic members according to a second embodiment. FIG. 10(A) is a schematic perspective view, and FIG. 10(B) is a front view.

The method for joining metallic members uses an arrangement for producing, for example, a flare joint. A Fe-based metallic member 1001 containing a Fe-based material and an Al-based metallic member 1002 containing an Al-based material are used as the metallic members. The Fe-based metallic member 1 and the Al-based metallic member 2 have curved portions 1011 and 1012, respectively. In the arrangement of the Fe-based metallic member 1001 and the Al-based metallic member 1002, the curved portions 1011 and 1012 face each other, and a groove shape 1013 is formed by the curved portions 1011 and 1012. In this case, stepped portion is provided on the faced part of the Fe-based metallic member 1001 and the Al-based metallic member 1002.

In the method for joining metallic members according to the present embodiment, a Zn—Si-based filler metal 1003 having a wire-shaped is fed to the central portion of the groove shape 13 through a wire guide 1101, and while feeding, a tip portion of the Zn—Si-based filler metal 1003 is irradiated with laser beam. The Zn—Si-based filler metal 1003 containing Zn, Si and unavoidable impurities. In this case, it is preferred that Si is contained in an amount of 0.25 to 2.5% by weight, and the remainder contains Zn and unavoidable impurities.

Figure 11:
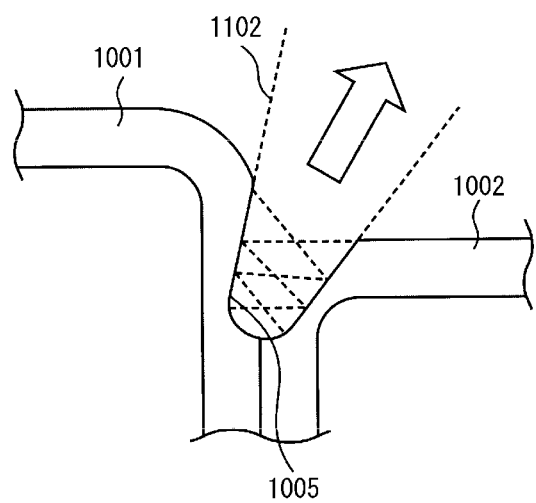
FIG. 11 is a cross-sectional view showing a constitution of the joined part in which a key hole is formed at the joining of the metallic members according to the second embodiment.

In the irradiation with laser beam 1102, it is preferred that the joined part between the Fe-based metallic member 1001 and the Al-based metallic member 1002 is heated at a temperature higher than a melting point of the Fe-based material. FIG. 11 is a cross-sectional view showing a schematic constitution of the joined part in which a key hole 1005 is formed at the joining of the Fe-based metallic member 1001 and the Al-based metallic member 1002. In the joined part, melting and evaporation of a material occurs by heating, and the key hole 1005 is formed by evaporation reaction force (the arrow in FIG. 11) by the material evaporated. In this case, the molten Zn—Si-based filler metal is present on the periphery of the laser irradiation part. In the key hole 1005, the laser beam multiply reflects as shown dotted line in the FIG. 11. Therefore, in the key hole 1005, energy density is increased, and the entire surface from the upper side to the lower side in the key hole 1005 is nearly uniformly heated. By this, after passing the laser beam 1102, the molten Zn—Si-based filler metal entered the key hole 1005 can uniformly react with the entire surface in the key hole 1005.

Figure 10:
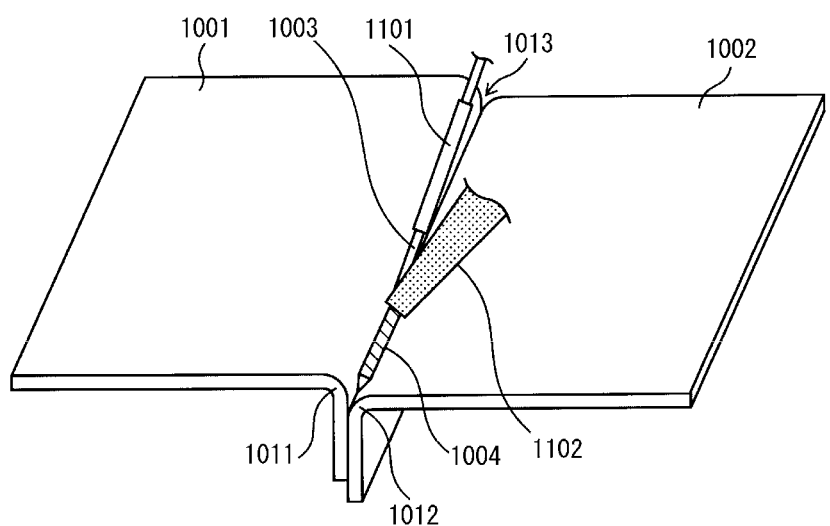
FIGS. 10(A) and 10(B) show a schematic constitution of the state of producing a joined structure by the method for joining metallic members according a second embodiment.
Figure 10:
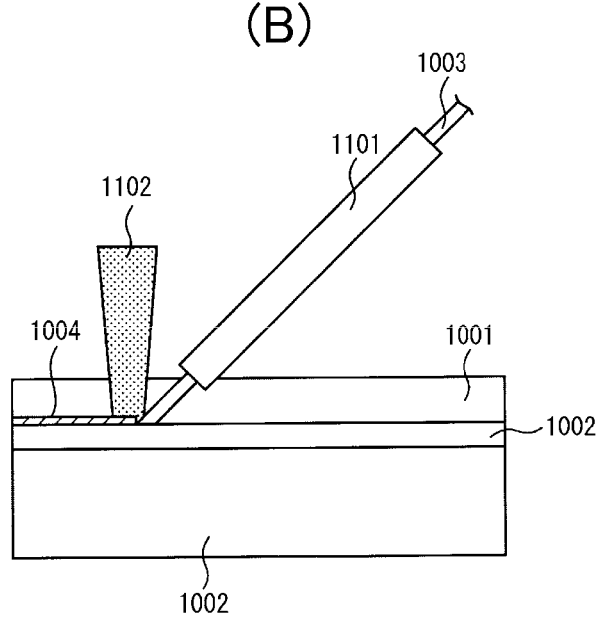
Figure 12:
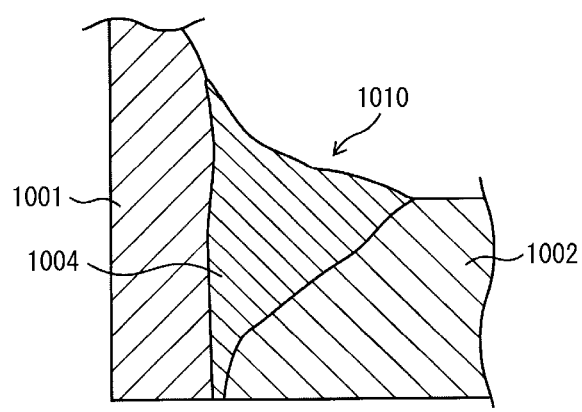
FIG. 12 is a cross-sectional block diagram showing one example of the joined structure obtained by the method for joining metallic members according to the second embodiment.

By conducting the heating by irradiation with the laser beam 1102 to the groove shape 1013 from the near side to the far side in FIG. 10 along the extending direction of the groove shape 1013, a joined structure 1010 of the Fe-based metallic member 1001 and the Al-based metallic member 1002 can be produced as shown in FIG. 12.

The joined structure 1010 is provided with the Fe-based metallic member 1001 and the Al-based metallic member 1002, and a joining layer 1004 containing a Zn—Si-based material is formed between the Fe-based metallic member 1001 and the Al-based metallic member 1002. In the second embodiment, an intermetallic compound layer is not present in the interface part between the Fe-based metallic member 1001 and the joining layer 1004. In this case, in the joining layer 1004, Si particles are scattered in a matrix, and smaller particle diameter thereof is preferred. Specifically, the particle size of Si is preferably a size (for example, 10 μm or less) which does not impair mechanical elongation possessed by Zn. It is presumed that the formation of Si fine particles is conducted by the cutting of crystal particles at an extrusion process in the production of a filler metal.

In the second embodiment, joining of dissimilar metallic members between the Fe-based metallic member 1001 and the Al-based metallic member 1002 is conducted using the Zn—Si-based filler metal 1003. Therefore, a brittle intermetallic compound layer is not formed in the interface part between the Fe-based metallic member 1001 and the Al-based metallic member 1002. As a result, strength of the interface part between the Fe-based metallic member 1001 and the joining layer 1004 can be improved, and consequently the joined structure 1010 can obtain joint strength nearly equal to that of the joining of similar metallic members. Particularly, a filler metal containing 0.25 to 2.5% by weight of Si and the remainder being Zn and unavoidable impurities is used as the Zn—Si-based filler metal 1003, and therefore, joint strength (particularly peel strength) can further be improved.

The molten Zn—Si-based filler metal entered the key hole 1005 formed in the joined part of the Fe-based metallic member 1001 can uniformly react with the entire surface in the key hole 1005, and strength of the interface part between the Fe-based metallic member 1001 and the joining layer 1004 can further be increased. As a result, joint strength of the joined structure 1010 can further be improved.

A Zn-based material and a Fe—Zn-based material vaporize. By this, plated portion plated on the Fe-based material vaporizes regardless of the kinds of plating such as GA plating or GI plating. Therefore, good joint part can be obtained regardless of the kinds of plating. Furthermore, an oxide coating film on the surface of the Fe-based material is removed by vapor pressure in the melting and vaporization due to overheating. Therefore, even though flux is not used, joining of dissimilar metallic members can well be conducted.

The second embodiment is described in further detail below by referring to the specific example.

In the example, the Fe-based metallic member and the Al-based metallic member were arranged as same as the arrangement embodiment shown in FIG. 10, and a groove shape was formed by curved portions of those metallic members. A Zn—Si-based filler metal having wire-shaped was fed to a central portion of the groove shape, and while feeding, a tip portion of the Zn—Si-based filler metal having wire-shaped was irradiated with laser beam. Thus, a flare joint-shaped joined structure of metallic members was produced.

Joining conditions were that a light collection diameter of laser beam is 1.8 mm, a laser output is 1.4 kV, a joining speed is 1 m/min, and a wire speed is 3.2 m/min. A steel plate (JAC270, plate thickness: 1.0 mm, length in longitudinal direction in FIG. 1: 200 mm, length in horizontal direction in FIG. 1: 80 mm) was used as the Fe-based metallic member, and an Al plate (A6K21-T14, plate thickness: 1.0 mm, length in longitudinal direction in FIG. 1: 200 mm, length in horizontal direction in FIG. 1: 80 mm) was used as the Al-based metallic member.

In the above joining of metallic members, Zn—Si-based filler metals having different Si content (Si content is 0.25 wt %, 1.0 wt % and 2.5 wt %) are provided, joining of metallic members is conducted using each Zn—Si-based filler metal, and joined structures of metallic members corresponding to each of the Zn—Si-based filler metals were obtained. Each joined structure was cut into a strip in a direction perpendicular to a joining direction, and plural test pieces were obtained. A wire diameter of all Zn—Si-based filler metals was 1.2 mm. Various evaluations were conducted using the thus-obtained test pieces of the joined structures.

[EPMA Elemental Map Analysis and SEM Observation of Interface Part between Fe-based Metallic Member and Joining Layer]

Figure 13:
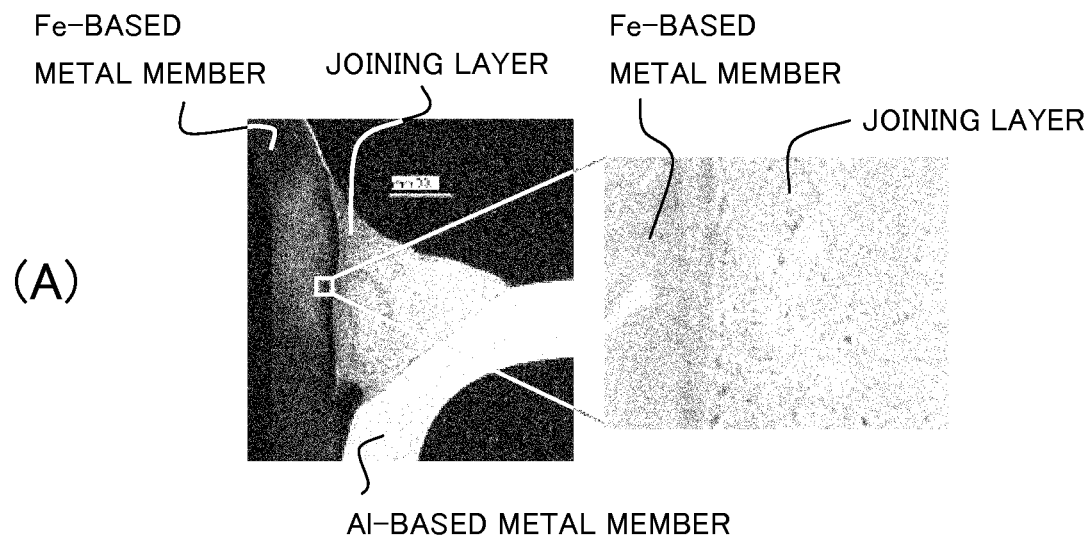
FIG. 13(A) is SEM photograph (left-side photograph) of a joint part of a joined structure and enlarged SEM photograph (right-side photograph) of an interface between an Fe-based metallic member and a joining layer in the left-hand photograph.
FIG. 13(B) is EPMA map analysis photographs of the interface shown in the enlarged SEM photograph of FIG. 13(A).
Figure 13:
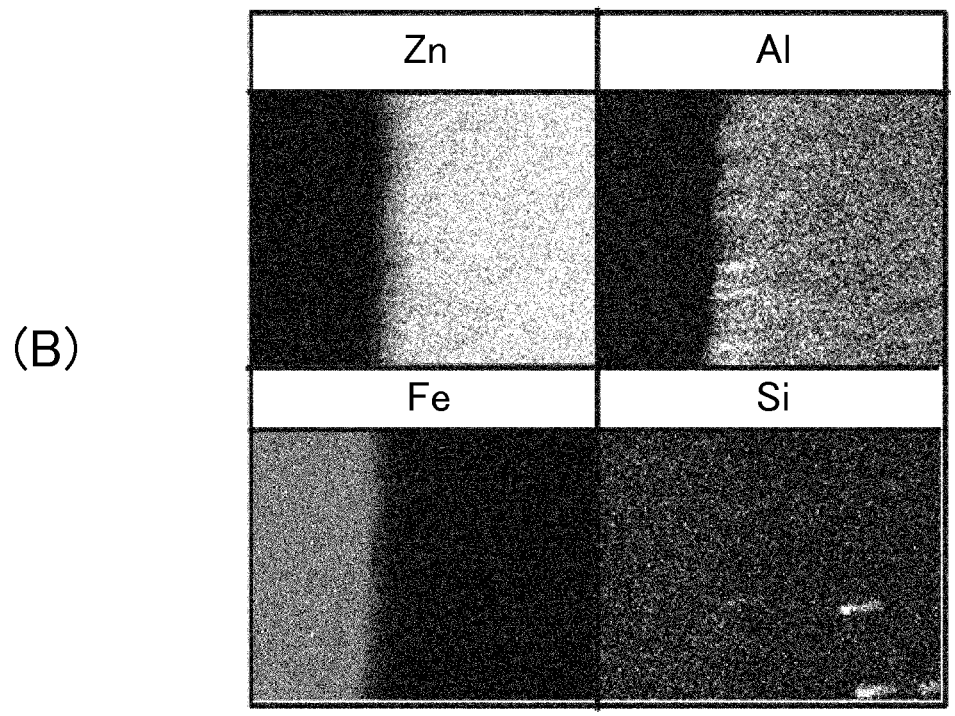

A test piece of the joined structure obtained using the Zn—Si-based filler metal having Si content of 1.0 wt % was subjected to elemental analysis by an electron prove microanalyzer (EPMA). The results obtained are shown in FIG. 13(A) and FIG. 13(B). FIG. 13(A) is SEM photograph (left-side photograph) of the joint part of the joined structure and enlarged SEM photograph (right-side photograph) of the interface between the Fe-based metallic member and the joining layer in the photograph, and FIG. 13(B) is EPMA map analysis photographs (Zn, Al, Fe and Si) of the interface shown in the enlarged SEM photograph of FIG. 13(A).

Figure 14:
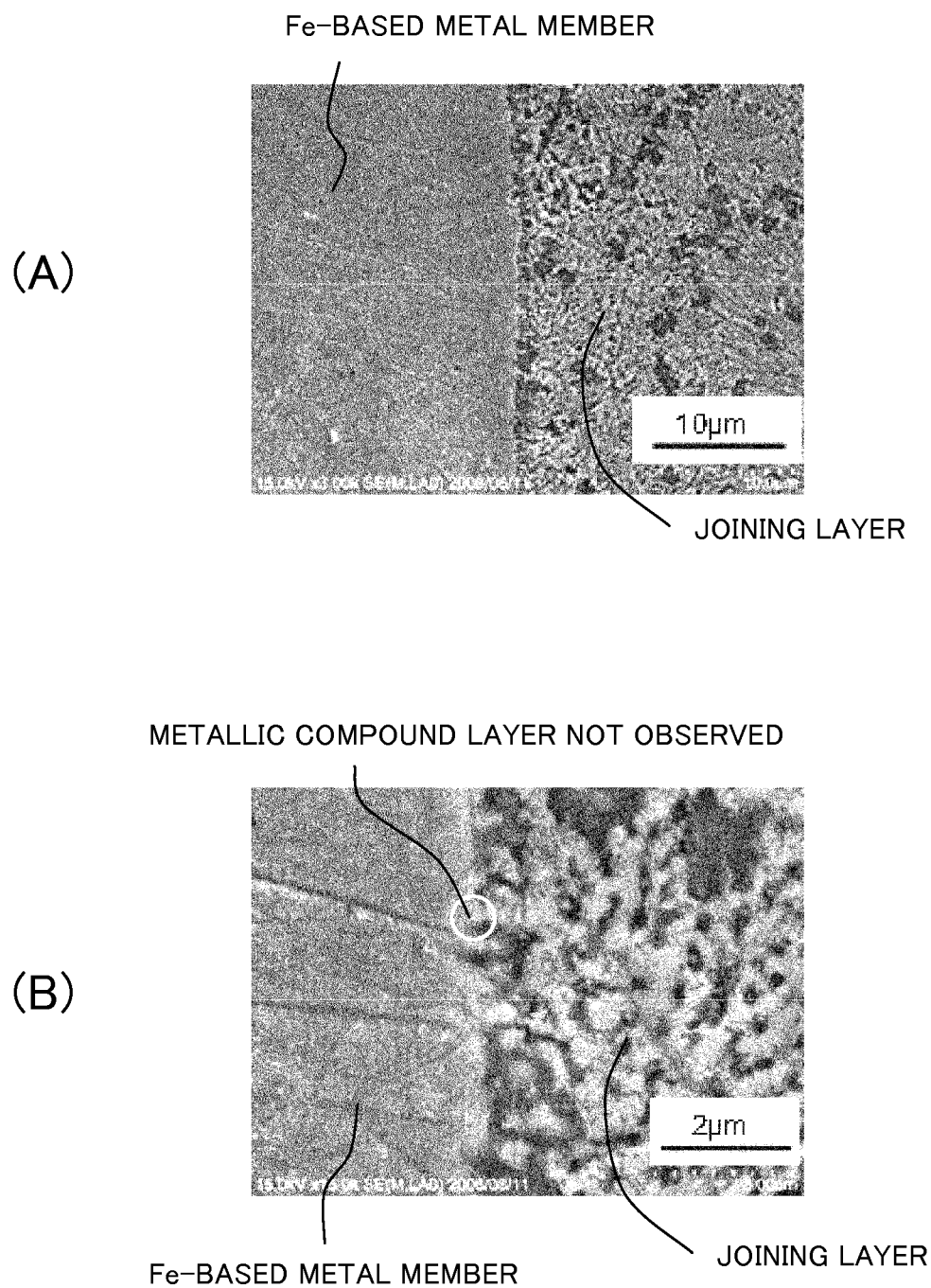
FIG. 14(A) and FIG. 14(B) are SEM photographs of an interface between an Fe-based metallic member and a joining layer.

Regarding a test piece of the same joined structure, the interface between the Fe-based metallic member and the joining layer was observed with a scanning electron microscope (SEM). The results obtained are shown in FIG. 14(A) and FIG. 14(B). FIG. 14(A) and FIG. 14(B) are SEM photographs of the interface between the Fe-based metallic member and the joining layer. FIG. 14(A) is SEM photograph of 3,000 magnifications, and FIG. 14(B) is SEM photograph of 15,000 magnifications.

As shown in FIG. 13(A), an intermetallic compound layer formed in the conventional joined structure was not observed in the interface between the Fe-based metallic member and the joining layer of the present example. In the EPMA elemental map analysis shown in FIG. 13(B), Si was uniformly scattered, and the interface of Fe and Zn (that is, the interface between the Fe-based metallic member and the joining layer) was clearly observed. Al is Al of the Al-based metallic member, which was solid-solubilized to the joining layer by welding. Furthermore, as shown in the SEM photograph of 3,000 magnifications of FIG. 14(A) and the SEM photograph of 15,000 magnifications of FIG. 14(B), even though magnification in SEM observation was increased, an intermetallic compound layer formed in the conventional joined structure was not observed in the interface between the Fe-based metallic member and the joining layer of the present example.

As a result of the above EPMA elemental map analysis and SEM observation, it was confirmed that a brittle intermetallic compound layer formed in a joined structure joined with a Zn—Si-based filler metal is not present in the interface between the Fe-based metallic member and the joining layer of the example of the present invention.

[Joint Strength Evaluation of Metal Joined Structure]

A test piece of each joined structure using a Zn—Si-based filler metal having Si content of 0.25 wt %, 1.0 wt % or 2.5 wt % was subjected to a flare tensile strength test and a peel strength test. Two pieces at the central portion side of the joined structure and four test pieces at the both end portion sides thereof were used as the test piece. Those test pieces were allocated to each strength test, and one test piece at the central portion side and two test pieces at both end portion sides (total: three test pieces) were used in each of the flare tensile strength test and the peel strength test.

Figure 15:
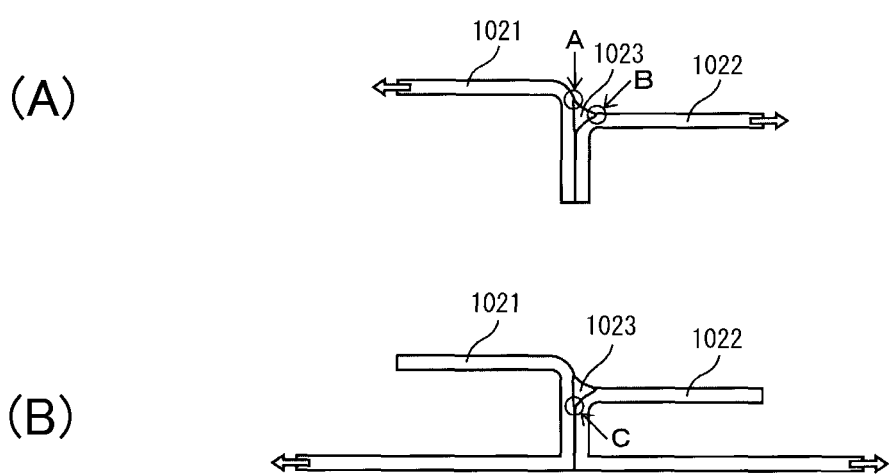
FIGS. 15(A) and 15(B) are schematic cross-sectional views of a joined structure for explaining methods of a flare tensile strength test and a peel strength test.

In the flare tensile strength test, forces in mutually opposite directions were applied to the extending portions in a horizontal direction of the Fe-based metallic member 1021 and the Al-based metallic member 1022 that form a T-shape at an area on which a joining layer 1023 was formed, as shown in FIG. 15(A). In the flare tensile strength test, stress is most applied at the portions indicated by the arrows A and B.

Figure 16:
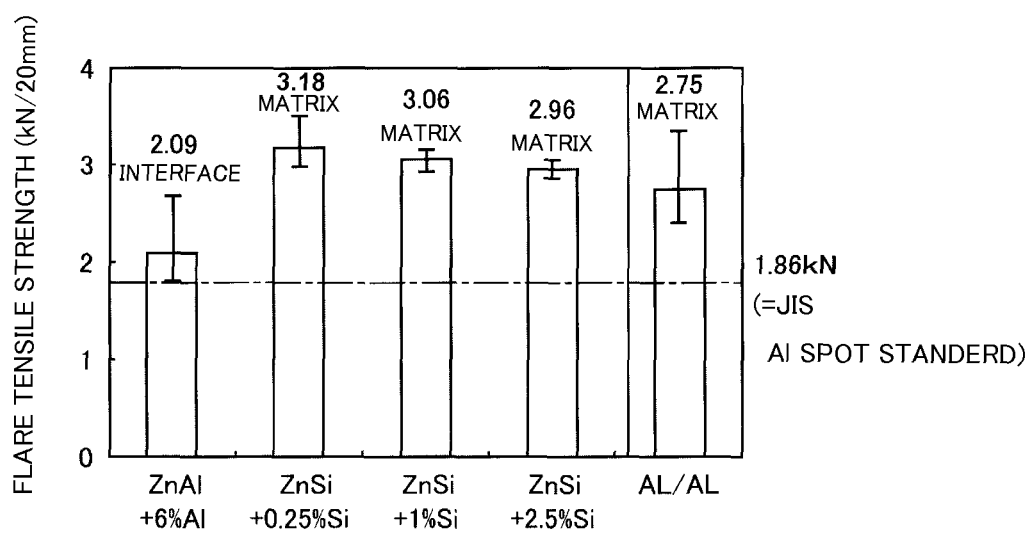
FIG. 16 is a graph showing strength of each sample obtained in the flare tensile strength test.

The results (flare tensile strength value and rupture portion) are shown in Table 3 and FIG. 16. In Table 3, test results of test pieces of joined structures corresponding to the Zn—Si-based filler metals having Si content of 0.25 wt %, 1.0 wt % and 2.5 wt % are indicated as Samples 11 to 13, respectively. Table 3 also shows the results of Comparative Samples 11 and 12. Comparative Sample 11 is a test piece of the joined structure between the Fe-based metallic member and the Al-based metallic member, obtained using a Zn—Al-based filler metal having an Al content of 6 wt % as the filler metal. Comparative Sample 12 is a test piece of the joined structure of two Al-based metallic members, obtained using the commercially available filler metal as a filler metal. Test pieces of Comparative Samples 11 and 12 are obtained by cutting the joined structures obtained into strips similarly to Samples 11 to 13. FIG. 16 shows an average value of flare tensile strength of each sample and rupture portion.

Strength standard value of flare tensile strength test (dashed-dotted line of FIG. 16) is set as follows. Joint length of continuous welding equivalent to one shot of spot welding is set to 20 mm, and spot welding of Al each other in JIS 23140 was taken as the standard. By this, tensile strength standard of spot welding in which a plate thickness of Al is 1.2 mm is 1.86 kN/20 mm.

TABLE 3

|  | Combination of matrixes (upper) Material of filler metal (lower) | Tensile strength in each portion (kN/20 mm) | | | Average value of tensile strength (kN/20 mm) | Rupture portion |
|---|---|---|---|---|---|---|
| Sample 11 | Fe/Al ZnSi (Si content: 0.25%) | 2.97 | 3.40 | 3.18 | 3.18 | Al-based metallic member (HAZ) |
| Sample 12 | Fe/Al ZnSi (Si content: 1%) | 3.12 | 3.15 | 2.92 | 3.06 | Al-based metallic member (HAZ) |
| Sample 13 | Fe/Al ZnSi (Si content: 2.5%) | 2.96 | 2.86 | 3.06 | 2.96 | Al-based metallic member (HAZ) |
| Comparative Sample 11 | Fe/Al ZnAl (Al content: 6%) | 1.90 | 1.80 | 2.58 | 2.09 | Interface between Fe-based metallic member and filler metal |
| Comparative Sample 12 | Al/Al Commercially available filler metal | 3.35 | 2.51 | 2.40 | 2.75 | Al-based metallic member |

As shown in Table 3 and FIG. 16, tensile strength of Samples 11 to 13 according to the second embodiment, which are joined structures of dissimilar metallic members, exceeded the strength standard value. Furthermore, tensile strength of Samples 11 to 13 according to the second embodiment was higher than tensile strength of Comparative Sample 11 that is a joined structure of dissimilar metallic members, and was also higher than tensile strength of Comparative Sample 12 that is a joined structure of similar metallic members. It was confirmed that tensile strength was greatly improved in a small Si content (0.25 wt %). It was further confirmed that Samples 11 to 13 according to the second embodiment were ruptured in the Al-based metallic member, unlike Comparative Sample 11 that was ruptured in the interface between the Fe-based metallic member and the joining layer.

In a peel strength test, forces in mutually opposite directions were applied to the extending portions in a horizontal direction of the Fe-based metallic member 1021 and the Al-based metallic member 1022 that form a T-shape at an area opposite the area on which a joining layer 1023 was formed, as shown in FIG. 15(B). In the peel strength test, by concentrating high stress to a joined interface (the portion indicated by the arrow C), strength of joined interface can be measured.

Figure 17:
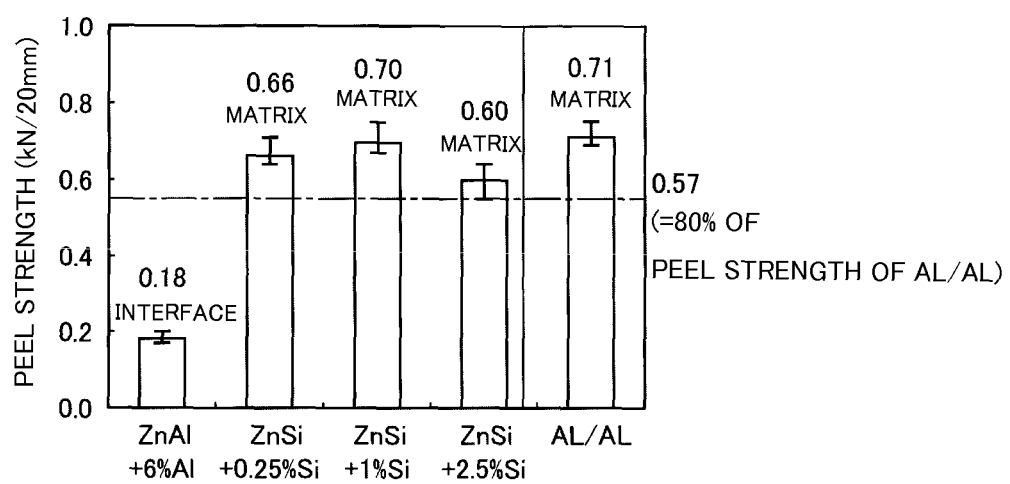
FIG. 17 is a graph showing strength of each sample obtained in the peel strength test.
Figure 18:
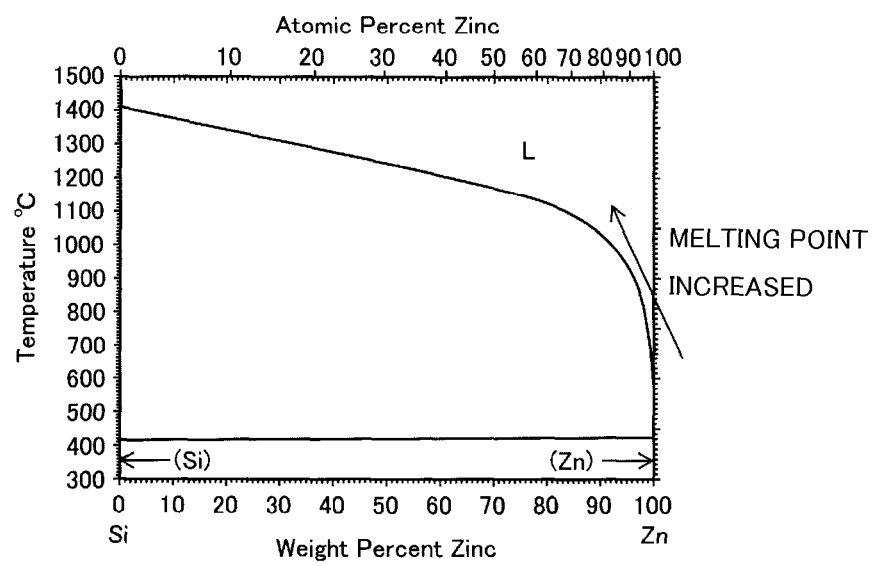
FIG. 18(A) is a binary equilibrium diagram of ZnSi.
FIG. 18(B) is a binary equilibrium diagram of ZnAl.
Figure 18:
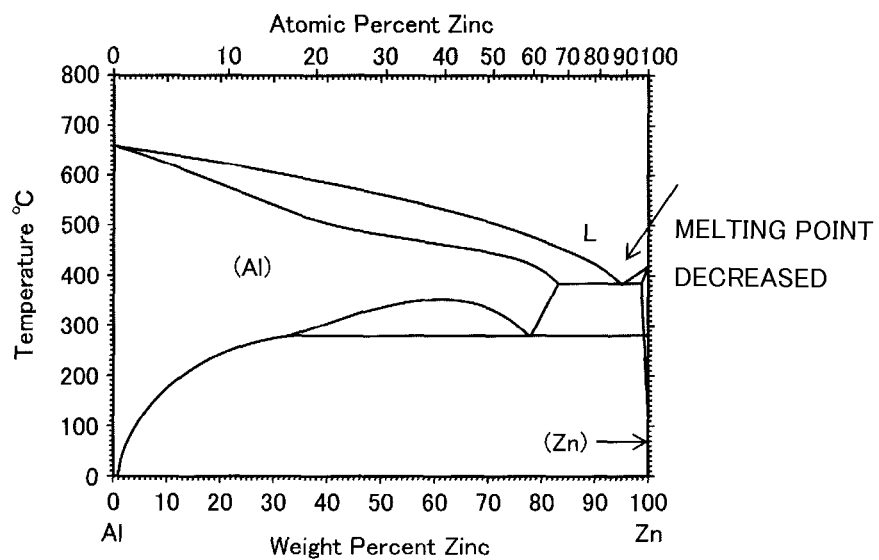

The results (peel tensile strength value and rupture state) are shown in Table 4 and FIG. 17. In Table 4, test results of test pieces of joined structures corresponding to the Zn—Si-based filler metals having Si content of 0.25 wt %, 1.0 wt % and 2.5 wt % are shown as Samples 21 to 23, respectively. Table 4 also shows the results of Comparative Samples 21 and 22. Comparative Sample 21 is a test piece of the joined structure between the Fe-based metallic member and the Al-based metallic member, obtained using the Zn—Al-based filler metal having an Al content of 6 wt % as the filler metal. Comparative Sample 22 is a test piece of a joined structure of two Al-based metallic members, obtained using the commercially available filler metal as the filler metal. Test pieces of Comparative Samples 21 and 22 are obtained by cutting the joined structures obtained into strips similar to Samples 21 to 23. FIG. 17 also shows average values of peel strength of each sample and rupture portion.

Strength standard value of peel strength test (dashed-dotted line of FIG. 17) is 80% of peel strength value of a test piece of Comparative Sample 22 (joined structure of Al-based metallic members) which is a joined structure of similar metallic members, obtained using the commercially available filler metal.

TABLE 4

|  | Combination of matrixes (upper) Material of filler metal (lower) | Peel strength in each portion (kN/20 mm) | | | Average value of Peel strength (kN/20 mm) | Rupture portion |
|---|---|---|---|---|---|---|
| Sample 21 | Fe/Al ZnSi (Si content: 0.25%) | 0.64 | 0.69 | 0.66 | 0.66 | Al-based metallic member (HAZ) |
| Sample 22 | Fe/Al ZnSi (Si content: 1%) | 0.67 | 0.75 | 0.67 | 0.70 | Al-based metallic member (HAZ) |
| Sample 23 | Fe/Al ZnSi (Si content: 2.5%) | 0.61 | 0.64 | 0.55 | 0.60 | Interface between Fe-based metallic member and filler metal |
| Comparative Sample 21 | Fe/Al ZnAl (Al content: 6%) | 0.18 | 0.20 | 0.17 | 0.18 | Interface between Fe-based metallic member and filler metal |
| Comparative Sample 22 | Al/Al Commercially available filler metal | 0.75 | 0.69 | 0.7 | 0.71 | Al-based metallic member |

As shown in Table 4 and FIG. 17, peel strength of Samples 21 to 23 according to the second embodiment that are joined structures of dissimilar metallic members exceeded the strength standard. It was confirmed that peel strength of Samples 21 to 23 according to the second embodiment was greatly improved in a small Si content (0.25%), from the comparison with Comparative Sample 21 that is a joined structure of dissimilar metallic members. It was further confirmed that Samples 21 and 22 according to the second embodiment were ruptured in the Al-based metallic member similar to Comparative Sample 22 that is a joined structure of similar metallic members, unlike Comparative Sample 21 which was ruptured in the interface between the Fe-based metallic member and the joining layer. It is presumed that peel strength of Sample 23 according to the second embodiment was slightly decreased by the decrease in the joined interface width due to the decrease in wettability, as compared with Samples 21 and 22 according to the second embodiment, and Sample 23 was ruptured in the interface between the Fe-based metallic member and the joining layer.

As described above, in the samples of the present invention, which are the joined structures of dissimilar metallic members using the Zn—Si-based filler metal having an Si content of 0.25 wt % to 2.5 wt %, its strength exceeded the strength standard value. It was understood that strength of the samples according to the second embodiment was greatly improved in a small Si content (0.25 wt %) from the comparison with Comparative Samples which are the joined structures of the same dissimilar metallic members. Particularly, it was understood that the samples of the present invention, which are the joined structure of dissimilar metallic members using the Zn—Si-based filler metal having an Si content of 0.25 wt % to 1.0 wt %, were not ruptured in the interface between the Fe-based metallic member and the joining layer, and were ruptured in the Al-based metallic member, and from this fact, a strong joined structure like the joined structure of similar metallic members can be obtained.

The method in the examples used laser. However, the method is not limited to the use of laser, and various means can be used. Specifically, arc brazing using plasma, TIG or MIG as a heat source, furnace brazing (joining using a preplaced filler metal (sheet-shaped or rod-shaped preplaced filler metal) in a heating furnace), high frequency brazing (heating a matrix by high frequency induction heating (IH)) and the like can be used.

<Third Embodiment>

Figure 19:
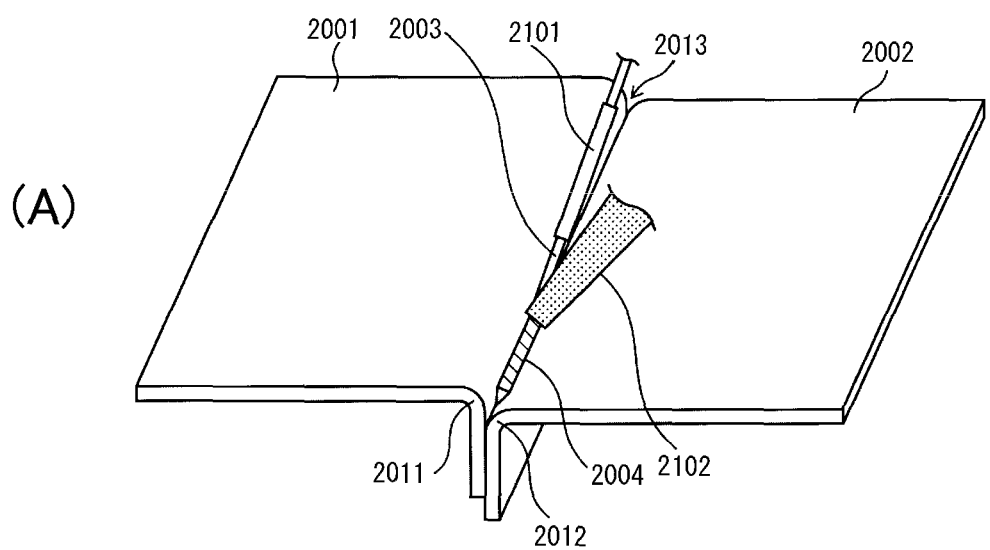
FIGS. 19(A) and 19(B) show schematic constitutions of the state of producing a joined structure by a method for joining metallic members according to a third embodiment.
Figure 19:
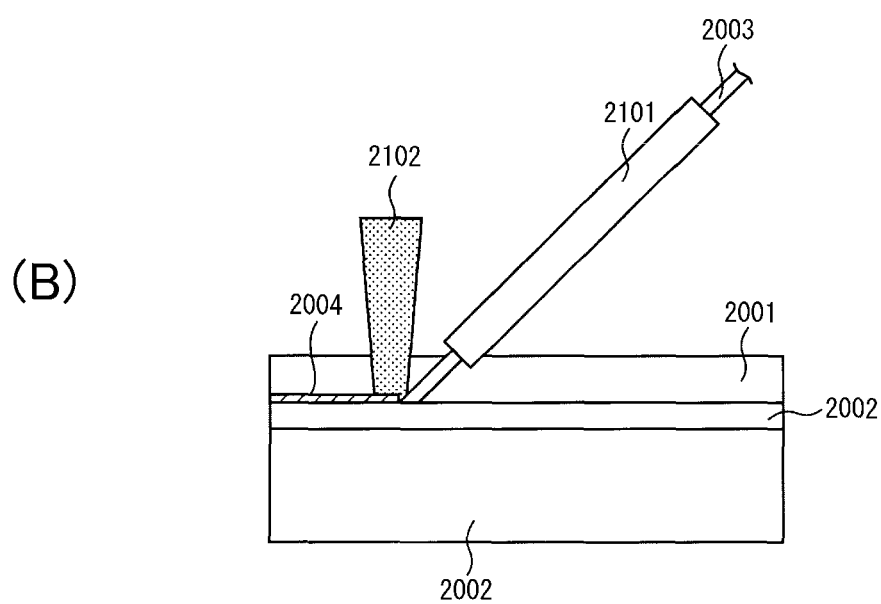

A third embodiment of the present invention is described below by referring to the drawings. FIG. 19(A) and FIG. 19(B) show schematic constitution of the state that joining is conducted using a method for joining metallic members according to a third embodiment. FIG. 19(A) is a schematic perspective view, and FIG. 19(B) is a view seen from an Al-based metallic member 2002 in FIG. 19(A).

The method for joining metallic members uses an arrangement for producing, for example, flare joint. A Fe-based metallic member 2001 containing a Fe-based material and an Al-based metallic member 2002 containing an Al-based material are used as the metallic members. The Fe-based metallic member 2001 and the Al-based metallic member 2002 have curved portions 2011 and 2012. In the arrangement of the Fe-based metallic member 2001 and the Al-based metallic member 2002, the curved portions 2011 and 2012 face each other, and a groove shape 2013 is formed by those curved portions 2011 and 2012. In this case, stepped portion is provided in the faced portion between the Fe-based metallic member 2001 and the Al-based metallic member 2002.

In the method for joining metallic members according to the third embodiment, a Zn-based filler metal 2003 having wire-shaped is fed to the central portion of the groove shape 2013 through a wire guide 2101, and while feeding, a tip portion of the filler metal is irradiated with laser beam 2102. Since the Zn-based filler metal 2003 can obtain a sufficient joint strength than a Sn-based filler metal, the Zn-based filler metal 2003 is preferred. The Zn-based filler metal 2003 may contain Al and Si as additive elements, and may not contain those. In the case that Si used as an additive element, it is preferred that Si is contained in an amount of 0.25 to 2.5 wt %, and the remainder contains Zn and unavoidable impurities.

Heating by irradiation with the laser beam 2102 is conducted to the groove shape 2013 from the near side to the far side in FIG. 19(A) along the extending direction of the groove shape 1013. FIGS. 20(A) to 20(D) and FIGS. 21(A) to (D) show the schematic constitutions of the method for joining metallic members according to the third embodiment. FIGS. 20(A) to 20(D) are schematic views seen from the same direction as FIG. 19(B) regarding each step, and FIGS. 21(A) to 21(D) are schematic views seen from the front of FIG. 19(A) regarding each step. In FIGS. 20(A) to 20(D), the laser beam 2102 moves to the right side in the drawings according to the step sequence. In FIGS. 20(A) to 20(D), indication of the Fe-based metallic member 2001 is omitted. In the heating by the irradiation with the layer beam 2102, it is preferred that a temperature of the joined part between the Fe-based metallic member 2001 and the Al-based metallic member 2002 is set to a temperature higher than a melting point of the Fe-based material.

Figure 20:
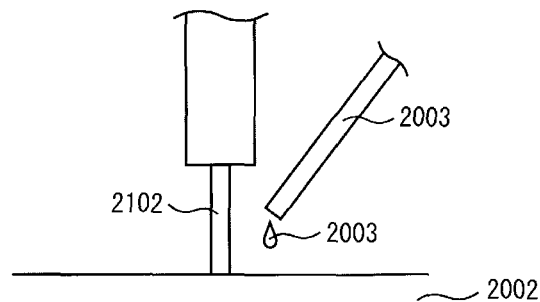
FIGS. 20(A) to 20(D) show schematic constitutions of the method for joining metallic members according to the third embodiment.
Figure 20:
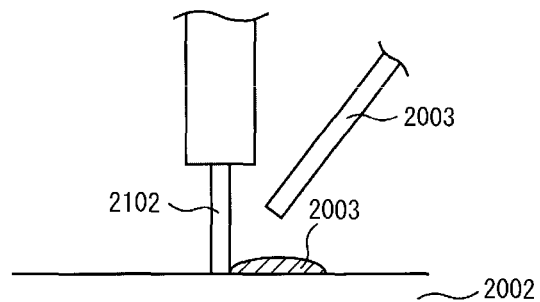
Figure 20:
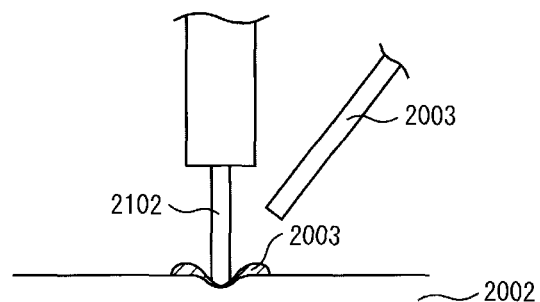
Figure 20:
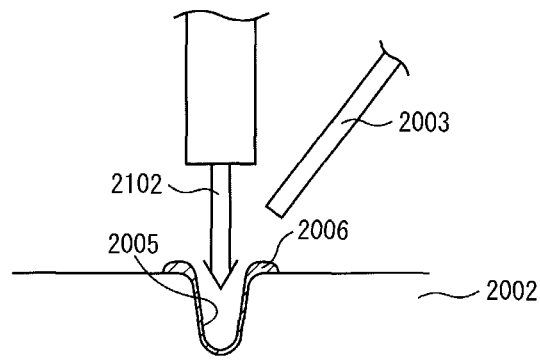
Figure 21:
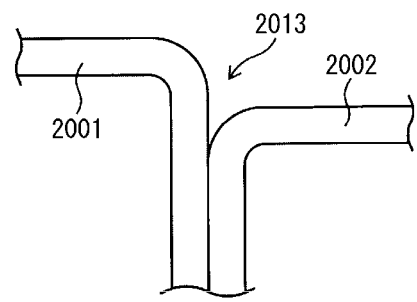
FIGS. 21(A) to 21(D) show schematic constitutions of the method for joining metallic members according to the third embodiment.
Figure 21:
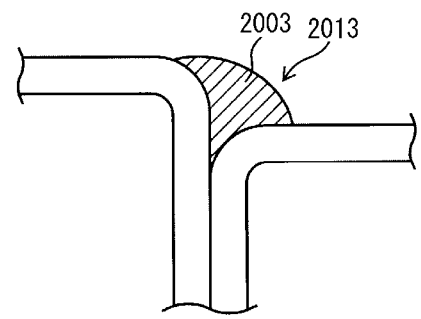
Figure 21:
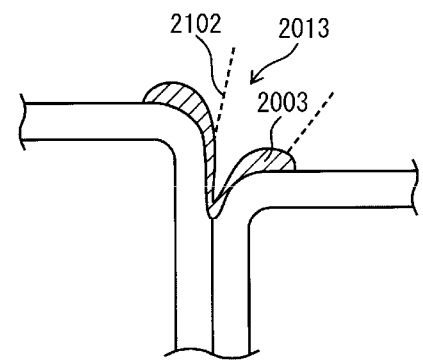
Figure 21:
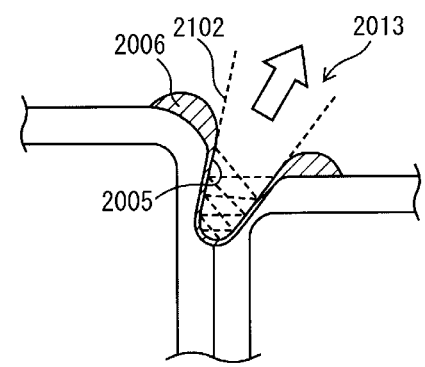

When the Zn-based filler member 2003 is melted by the irradiation with the laser beam 2102 as shown in FIGS. 20(A) and 21(A), the molten Zn-based filler metal 2003 drops down on the groove shape 2013 and spreads thereon as shown in FIGS. 20(B) and 21(B). When the laser beam 2102 moves and is located on the molten Zn-based filler metal 2003 as shown in FIGS. 20(C) and 21(C), the molten Zn-based filler metal 2003 evaporates by the direct irradiation with the laser beam 2102, and at the same time, the joined part of the Fe-based metallic member 2001 and the Al-based metallic member 2002 begins to melt. As a result, a key hole 2005 is formed in the joined part of the Fe-based metallic member 2001 and the Al-based metallic member 2002 as shown in FIGS. 20(D) and 21(D).

In this case, the formation of the key hole 2005 is conducted such that the key hole 2005 is filled with the evaporated Zn-based filler metal 2003. The Zn-based filler metal 2003 other than the evaporated portion is present on the periphery of the upper end portion of the key hole 2005 as a molten material 2006 together with the molten Fe-based metallic member 2001 and Al-based metallic member 2002 (molten metals). In the key hole 2005, the laser beam 2102 multiply reflects as shown in the dotted line in the drawings. As a result, energy density is increased in the key hole 2005, and the entire surface of from the upper side to the lower side in the key hole 2005 is nearly uniformly heated. By this, the molten material 2006 entering the key hole 2005 after passing the laser beam 2102 can uniformly react with the entire surface in the key hole 2005.

Figure 22:
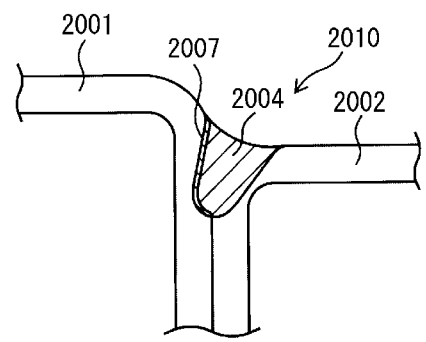
FIGS. 22(A) and 22(B) are cross-sectional block diagrams showing one example of a joined structure obtained by the method for joining metallic members according to the third embodiment.
Figure 22:
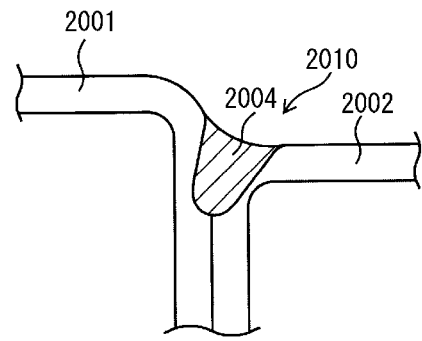

By conducting the heating by irradiation with the laser beam 2102 to the groove shape 2013 from the near side to the far side in FIG. 19(A) along the extending direction of the groove shape 2013, joined structures 2010A and 2010B of the Fe-based metallic member 2001 and the Al-based metallic member 2002 can be produced as shown in FIGS. 22(A) and 22(B). The joined structure 2010 is provided with the Fe-based metallic member 2001 and the Al-based metallic member 2002, and the joining layer 2004 containing a Zn-based material is formed between the Fe-based metallic member 2001 and the Al-based metallic member 2002.

In the case that Si is not used as an additive element to the Zn-based filler metal 2003, an uniform layer-shaped intermetallic compound layer 2007 is formed in the interface part between the Fe-based metallic member 2001 and the joining layer 2004 as shown in FIG. 22(A). The intermetallic compound layer 2007 has the action to suppress a reaction between Fe and Al, and it is presumed that the action prevents Al from flowing into the Fe-based metallic member 2001 and Fe from flowing into the Al-based metallic member 2002.

In the case that Si is used as an additive element to the Zn-based filler metal 2003, an intermetallic compound layer (reaction layer) is not present in the interface part between the Fe-based metallic member 2001 and the joining layer 2004 as shown in FIG. 22(B). In this case, in the joining layer 2004, Si particles are scattered in the matrix, and smaller particle diameter thereof is preferred. Specifically, it is preferred that the particle diameter of Si is a size (for example, 10 µm or less) which does not impair mechanical elongation possessed by Zn.

As described above, in the third embodiment, the entire surface from the upper side to the lower side in the key hole 2005 is nearly uniformly heated by multiple reflection of the laser beam 2102 in the key hole 2005 during heating the joined part. Therefore, after heating the joined part, the molten material 2006 entering the key hole 2005 can uniformly react with the entire surface in the key hole 2005. Furthermore, joining at low temperature becomes possible. Therefore, the molten material 2006 entering the key hole 2005 can instantaneously coagulate. As a result, the interface part between the Fe-based metallic member 2001 and the joining layer 2004 can uniformly be cooled.

Therefore, in the case that the intermetallic compound layer 2007 is formed between the Fe-based metallic member 2001 and the joining layer 2004, the intermetallic compound layer 2007 has a uniform layer shape, and this can improve joint strength. In the case that the intermetallic compound layer 2007 is not formed between the Fe-based metallic member 2001 and the joining layer 2004, a brittle layer is not present and unevenness is not generated in strength distribution in the interface part between the Fe-based metallic member 2001 and the joining layer 2004. As a result, joint strength can greatly be improved.

Formation of the key hole 2005 increases the joining area. Therefore, the above effect can well be obtained. Zn-based plating and alloyed Fe—Zn-based plating vaporize. In this case, the plated portion plated on the Fe-based material vaporizes regardless of the kinds of plating such as GA plating and GI plating. Consequently, good joint part can be obtained regardless of the kinds of plating. An oxide coating film on the surface of the Fe-based material is removed by vapor pressure in the melting and evaporation due to overheating. Therefore, even though flux is not used, joining of dissimilar metallic members can well be conducted.

<Fourth Embodiment>

In a fourth embodiment, in place of conducting multiple reflection of the laser beam 2102 in the key hole 2006 formed by melting the joined part of the Fe-based metallic member 2001 and the Al-based metallic member 2002 as in the third embodiment, the joined part of the Fe-based metallic member 2001 and the Al-based metallic member 2002 is not melted and multiple reflection of the laser beam 2102 is conducted in a groove shape 2013 formed by the Fe-based metallic member 2001 and the Al-based metallic member 2002. Other than the above, the fourth embodiment is the same as the method for joining metallic members according to the third embodiment. In the fourth embodiment, the same constituent elements as in the third embodiment have the same reference numerals and signs, and the explanation of the constituent elements having the same action as in the third embodiment is omitted.

FIGS. 23(A) to 23(D) show schematic constitution of the method for joining metallic members according to the fourth embodiment. FIGS. 23(A) to 23(D) are schematic views seen from the same direction as FIG. 19(B) regarding each step. In FIGS. 23(A) to 23(D), the laser beam 2102 moves to the right side in the drawings according to the step sequence.

Figure 23:
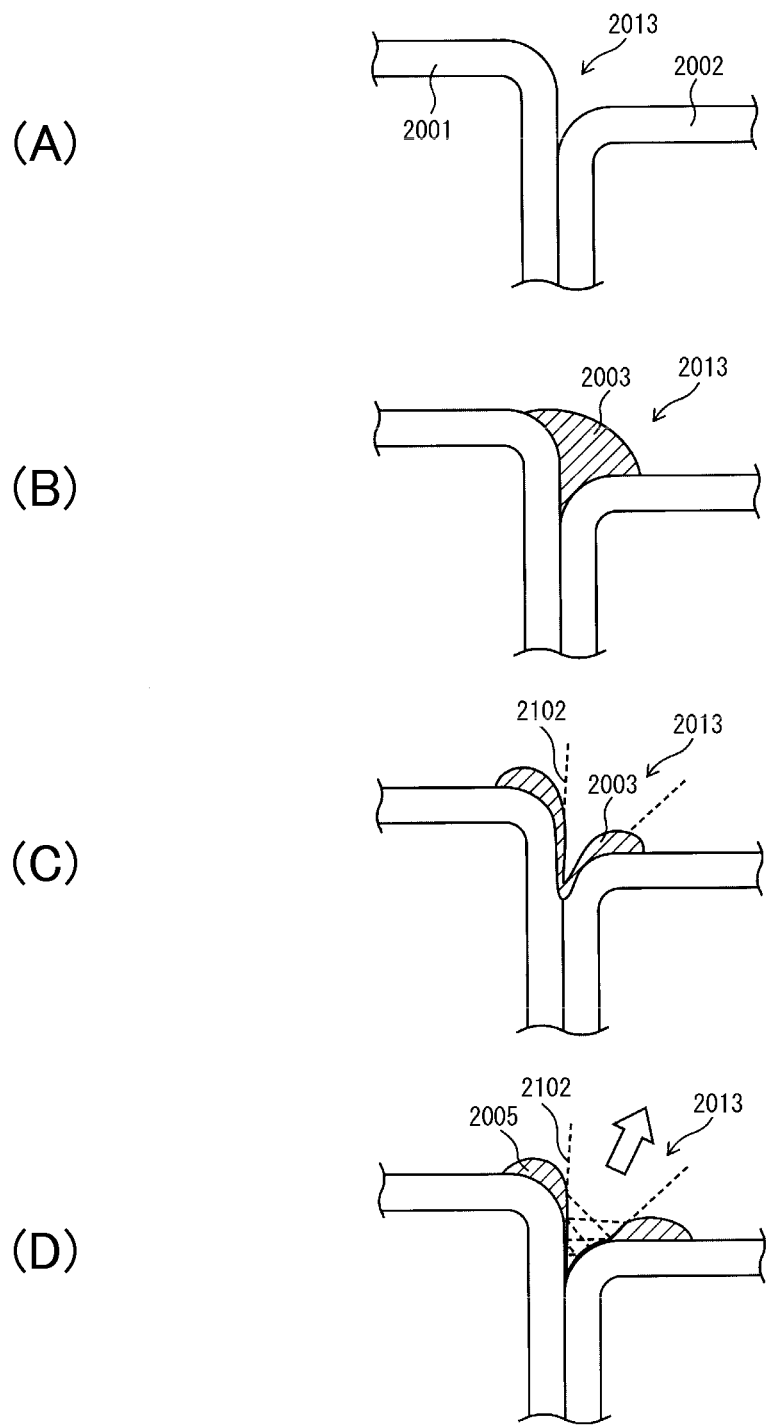
FIGS. 23(A) to 23(D) show schematic constitutions of a method for joining metallic members according to a fourth embodiment.

When the Zn-based filler member 2003 is melted by the irradiation with the laser beam 2102 as shown in FIG. 23(A), the molten Zn-based filler metal 2003 drops down on the groove shape 2013 and spreads thereon as shown in FIG. 23(B). When the laser beam 2102 moves and is located on the molten Zn-based filler metal 2003 as shown in FIG. 23(C), the molten Zn-based filler metal 2003 evaporates by the direct irradiation with the laser beam 2102.

In this case, the above operation is conducted such that the groove shape 2013 is filled with the evaporated Zn-based filler metal 2003. The Zn-based filler metal 2003 other than the evaporated portion is present on the periphery of the upper end portion of the groove shape 2013. On the surface in the groove shape 2013, the laser beam 2102 multiply reflects as shown in the dotted line in the drawings. As a result, energy density is increased in the key hole 2005, and the entire surface from the upper side to the lower side in the groove shape 2003 is nearly uniformly heated. By this, a molten material 2006 entering the key hole 2005 after passing the laser 2102 can uniformly react with the entire surface in the key hole 2005.

Figure 24:
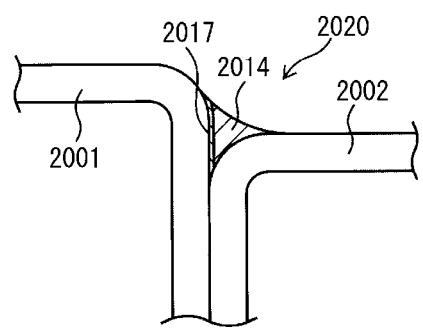
FIGS. 24(A) and 24(B) are cross-sectional block diagrams showing an example of the joined structure obtained by the method for joining metallic members according to the fourth embodiment.
Figure 24:
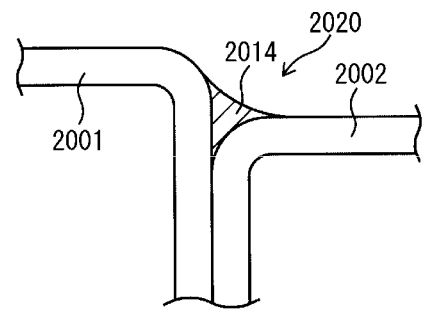

By conducting the heating by irradiation with the laser beam 2102 to the groove shape 2013 from the near side to the far side in FIG. 19(A) along the extending direction of the groove shape 2013, a joined structure 2020 of the Fe-based metallic member 2001 and the Al-based metallic member 2002 can be produced as shown in FIGS. 24(A) and 24(B). The joined structure 2010 is provided with the Fe-based metallic member 2001 and the Al-based metallic member 2002, and a joining layer 2014 containing a Zn-based material is formed between the Fe-based metallic member 2001 and the Al-based metallic member 2002.

In the case that Si is not used as an additive element to the Zn-based filler metal 2003, an uniform layer-shaped intermetallic compound layer 2017 is formed in the interface part between the Fe-based metallic member 2001 and the joining layer 2014 as shown in FIG. 24(A). In the case that Si is used as an additive element to the Zn-based filler metal 2003, an intermetallic compound layer (reaction layer) is not present in the interface part between the Fe-based metallic member 2001 and the joining layer 2014 as shown in FIG. 24(B).

In the fourth embodiment, by conducting multiple reflection of the laser beam 2102 on the surface of the groove shape 2103 formed by the Fe-based metallic member 2001 and the Al-based metallic member 2002, the entire surface in the groove shape 2013 can nearly uniformly be heated. As a result, the same effect by multiple reflection as in the third embodiment can be obtained.

EXAMPLES

The third embodiment and the fourth embodiment are described in more detail by referring to the specific examples.

(1) Example 1

Case using Zn—Al-based Filler Metal

In Example 1, a Fe-based metallic member and an Al-based metallic member were arranged in the same arrangement embodiment shown in FIG. 19(A), and a groove shape was formed by curved portions of those metallic members. A wire-shaped Zn—Al-based filler metal was fed to a central portion of the groove shape through a wire guide, and while feeding, a tip portion of the Zn—Al-based grazing filler member was irradiated with laser beam. Thus, a flare joint-shaped joined structure of metallic members was produced.

Regarding joining conditions, a size of two metallic members had a length in a horizontal direction of 82 mm in FIG. 19(A) and a length in a longitudinal direction of 200 mm in FIG. 19(A), and a height of stepped portion in the joined part of two metallic members was 5 mm. A filler metal having a composition ratio (wt %) of Zn:Al=96:4 was used as a Zn—Al-based filler member. Ar gas was used as a shielding gas, and its feed amount was 25 liter/min. Irradiation angle of laser beam was 40°, and joining speed was 1 m/min.

In the above joining of metallic members, joined structures of metallic members (Sample 111, and Comparative Samples 111 and 112) were obtained by chaining laser output and wire speed every sample and changing the formation state of the key hole every sample. In Sample 111, the laser output was set to 1.2 kW, and the wire feeding speed was set to 2.5 m/min. Thus, appropriate heat input conditions in which the joined part of the Fe-based metallic member is melted by appropriate heating in the formation of a key hole were employed. In Comparative Sample 111, the laser output was set to 1 kW, and the wire feeding speed was set to 2 m/min. Thus, insufficient heat input conditions in which the joined part of the Fe-based metallic member is not melted by heating in the formation of a key hole were employed. In Comparative Sample 112, the laser output was set to 1.6 kW, and the wire feeding speed was set to 2 m/min. Thus, excessive heat input conditions in which the joined part of the Fe-based metallic member is melted by excessively heating in the formation of a key hole were employed.

Figure 25:
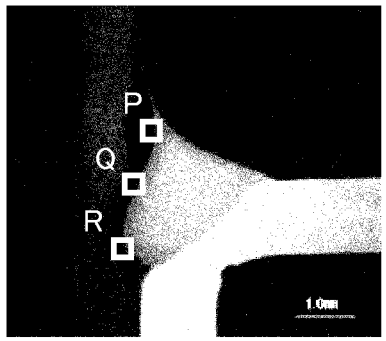
FIGS. 25(A) to 25(D) are SEM photographs of the joined structure of metallic members of the sample of Example 1.
Figure 25:
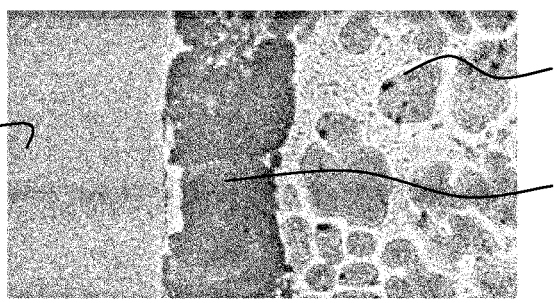
Figure 25:
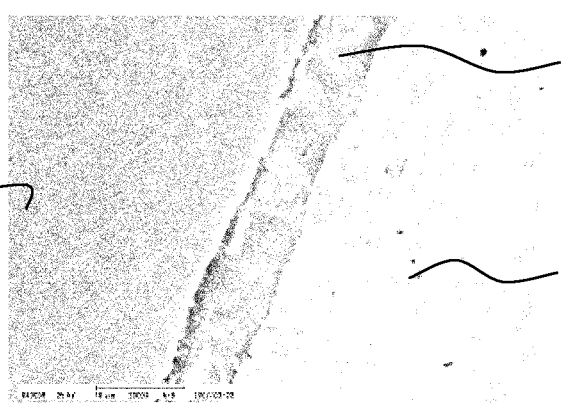
Figure 25:
Figure 26:
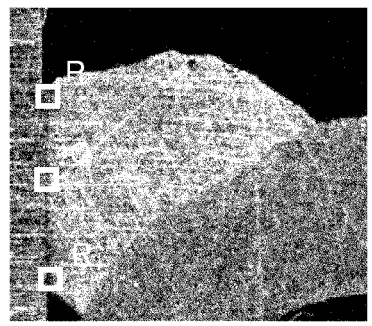
FIGS. 26(A) to 26(D) are SEM photographs of a joined structure of metallic members of the comparative sample of Example 1.
Figure 26:
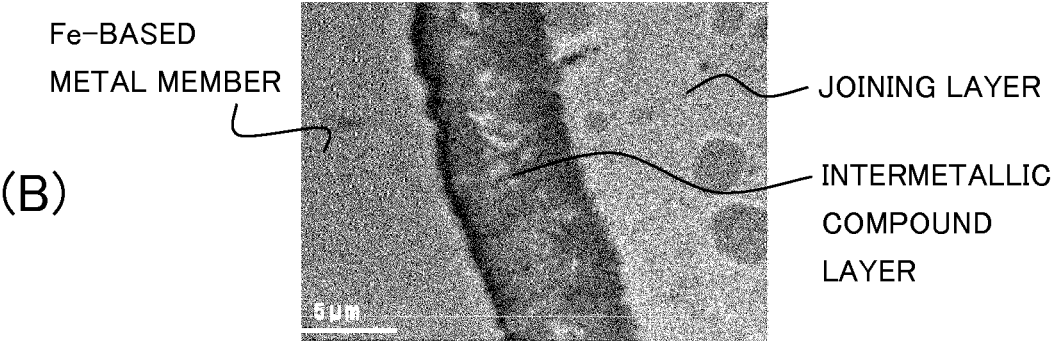
Figure 26:
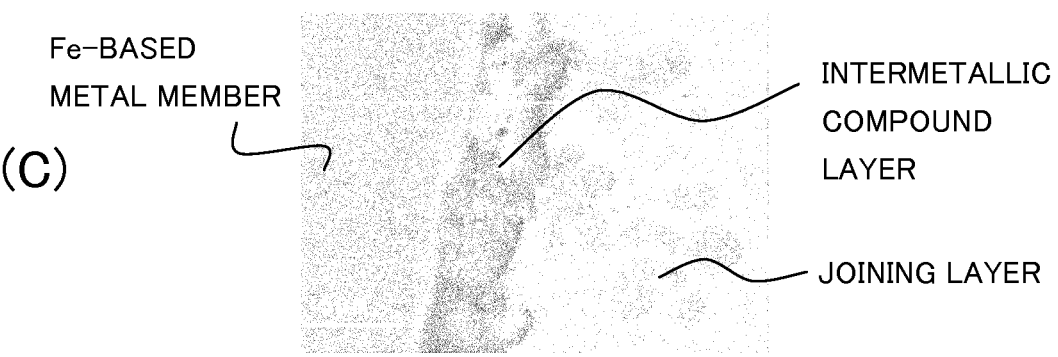
Figure 26:
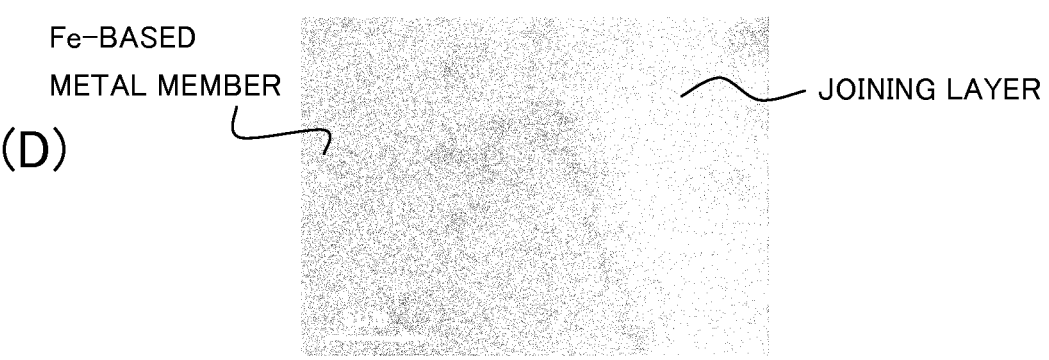
Figure 27:
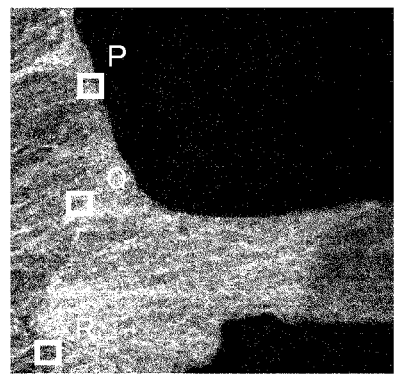
FIGS. 27(A) to 27(D) are SEM photographs of a joined structure of metallic members of the comparative sample of Example 1.
Figure 27:
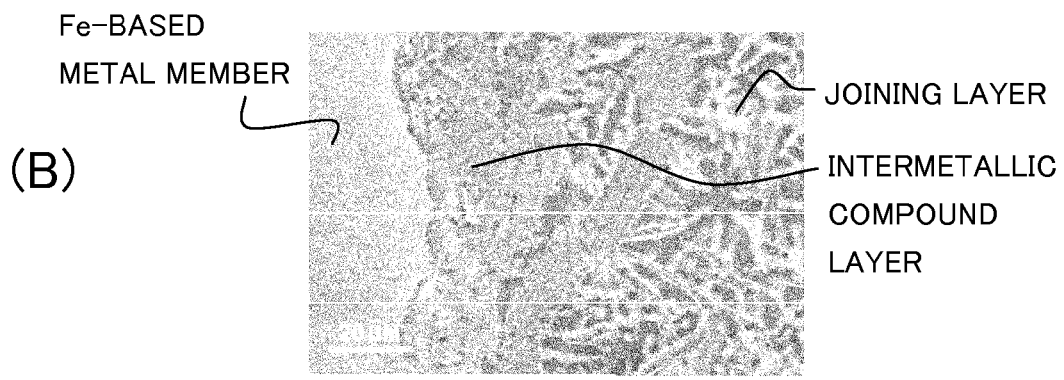
Figure 27:
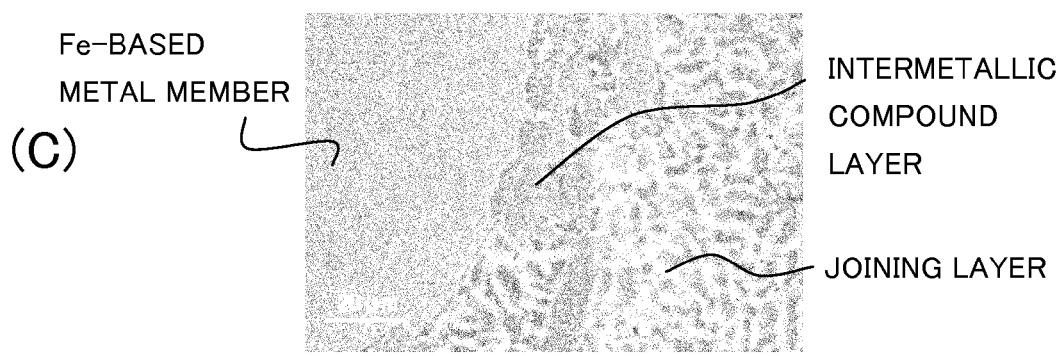
Figure 27:
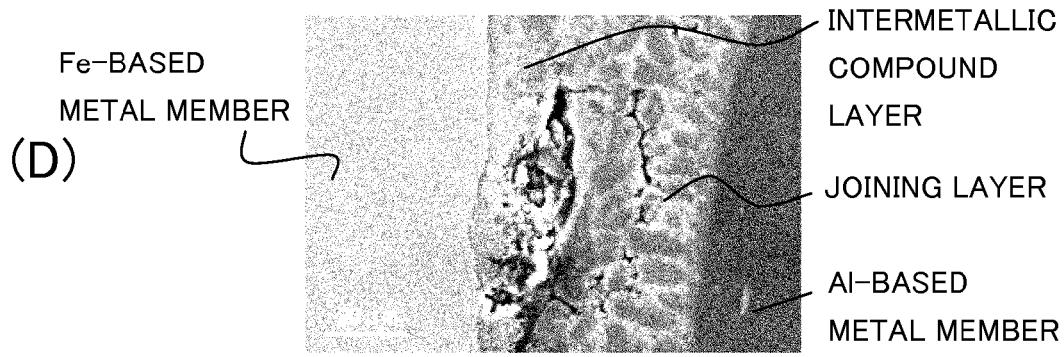

Regarding joined structures of metallic members of thus obtained Sample 111 and Comparative Samples 111 and 112, the state of the joint part and its neighborhood was observed using a scanning electron microscope (SEM). FIGS. 25 to 27 are SEM photographs of the joined structures of metallic members of Sample 111 and Comparative Samples 111 and 112. In each drawing, (A) is a whole photograph of the joint part and its neighborhood, (B) is a photograph of the upper portion P of the joined interface part between the Fe-based metallic member and the joining layer, (C) is a photograph of the central portion Q of the joined interface part between the Fe-based metallic member and the joining layer, and (D) is a photograph of the lower portion R of the joined interface part between the Fe-based metallic member and the joining layer.

As shown in FIG. 25, in the joined structure of Sample 111 in which appropriate heat input conditions were employed to form the key hole, an intermetallic compound layer made of Al—Fe—Zn system intermetallic compound having a stable layer-shaped was formed in all of the upper portion P, the central portion R and the lower portion Q of the joined interface part between the Fe-based metallic member and the joining layer, and the boundary between the Fe-based metallic member and the joining layer and the boundary between the Al-based metallic member and the joining layer became clear. Joint strength of the joined structure of Sample 11 was 154 N/mm.

As shown in FIG. 26, in the joined structure of Comparative Sample 111 in which insufficient heat input conditions were employed to form the key hole, an intermetallic compound layer made of Al—Fe—Zn system intermetallic compound having a stable layer-shaped was formed in the upper portion P of the joined interface part between the Fe-based metallic member and the joining layer. However, the boundary surface between the intermetallic compound layer made of the Al—Fe—Zn system intermetallic compound and the joining layer was unclear in the central portion Q of the joined interface part between the Fe-based metallic member and the joining layer, and an intermetallic compound layer was not formed in the lower portion R of the joined interface part. Joint strength of the joined structure of Comparative Sample 111 was 37 N/mm.

As shown in FIG. 27, in the joined structure of Comparative Sample 112 in which excessive heat input conditions were employed to form a key hole, an intermetallic compound layer made of an intermetallic compound containing Al, Fe and Zn was formed in the upper portion P, the central portion R and the lower portion Q of the joined interface part between the Fe-based metallic member and the joining layer. However, the intermetallic compound layer had a dendrite shape (no boundary surface) in the upper portion P and a mottled shape (no boundary surface at joining layer side) in the central portion Q and the lower portion R. Joint strength of the joined structure of Comparative Sample 112 was 30 N/mm.

As described above, it was confirmed in the joined structure of Sample ill that by the multiple reflection of laser beam under appropriate heat input conditions in the formation of a key hole, an uniform layer-shaped intermetallic compound layer can be formed in all of the upper portion P to the lower portion R of the joined interface part between the Fe-based metallic member and the joining layer, and joint strength can be improved, as compared with the joined structures of Comparative Examples 111 and 112. Particularly, it was confirmed that the boundary between the Fe-based metallic member and the joining layer and the boundary between Al-based metallic member and joining layer become clear as the intermetallic compound layer becomes a stable layer shape. It was understood by this that the intermetallic compound layer has the action to suppress a reaction between Fe and Al, and the action can prevent Al from flowing into the Fe-based metallic member and Fe from flowing into the Al-based metallic member.

(2) Example 2

Case using Zn—Si-based Filler Metal

In Example 2, a flare joint-shaped joined structure of metallic members was produced in the same manner as in Example 1, except for using a Zn—Si-based filler metal as a Zn-based filler metal. Joining conditions were that a light collection diameter of laser beam is 1.8 mm, a laser output is 1.4 kV, a joining speed is 1 m/min, and a wire speed is 3.2 m/min. Appropriate heat input conditions in which the joined part of the Fe-based metallic member is melted by appropriately heating in the formation of a key hole were employed. A steel plate (JAC270, plate thickness: 1.0 mm, length in longitudinal direction in FIG. 19(A): 200 mm, length in horizontal direction in FIG. 19(A): 80 mm) was used as the Fe-based metallic member, and an Al plate (A6K21-T14, plate thickness: 1.0 mm, length in longitudinal direction in FIG. 19(A): 200 mm, length in horizontal direction in FIG. 19(A): 80 mm) was used as the Al-based metallic member.

In the above joining of metallic members, Zn—Si-based filler metals having different Si content (Si content is 0.25 wt %, 1.0 wt % and 2.5 wt %) are provided, joining of metallic members is conducted using each Zn—Si-based filler metal, and joined structures of metallic members corresponding to each of the Zn—Si-based filler metals were obtained. Each joined structure was cut into a strip in a direction perpendicular to a joining direction, and plural test pieces were obtained. A wire diameter of all Zn—Si-based filler metals was 1.2 mm. Various evaluations were conducted using the thus-obtained test pieces of the joined structures.

[EPMA Elemental Map Analysis and SEM Observation of Interface Part between Fe-based Metallic Member and Joining Layer]

Figure 28:
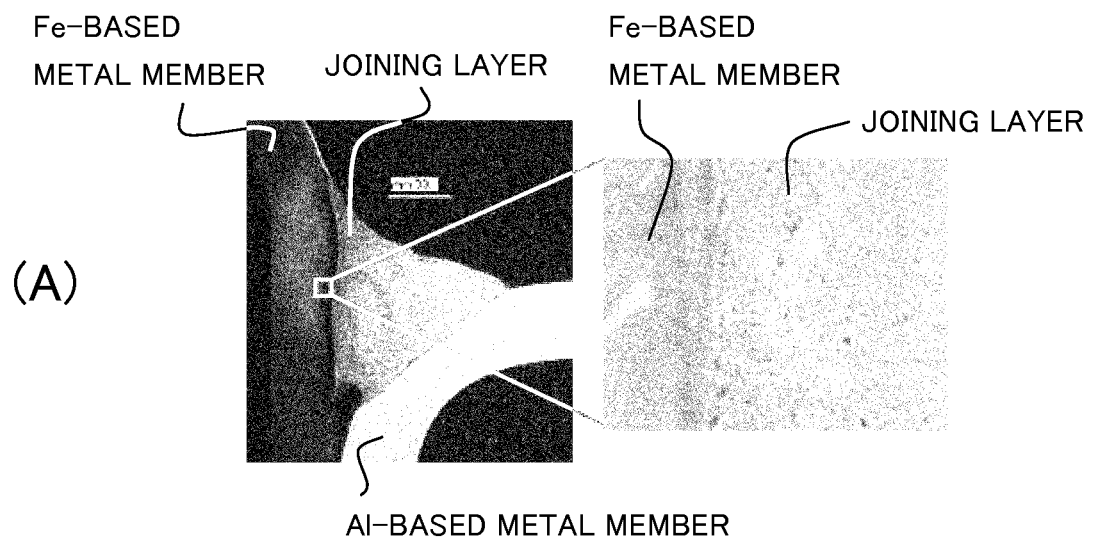
FIG. 28(A) is SEM photograph (left-side photograph) of a joint part of a joined structure of Example 2 and enlarged SEM photograph (right-side photograph) of an interface between an Fe-based metallic member and a joining layer in the left-side photograph.
FIG. 28(B) is EPMA map analysis photographs of the interface shown in the enlarged photograph of FIG. 28(A).
Figure 28:
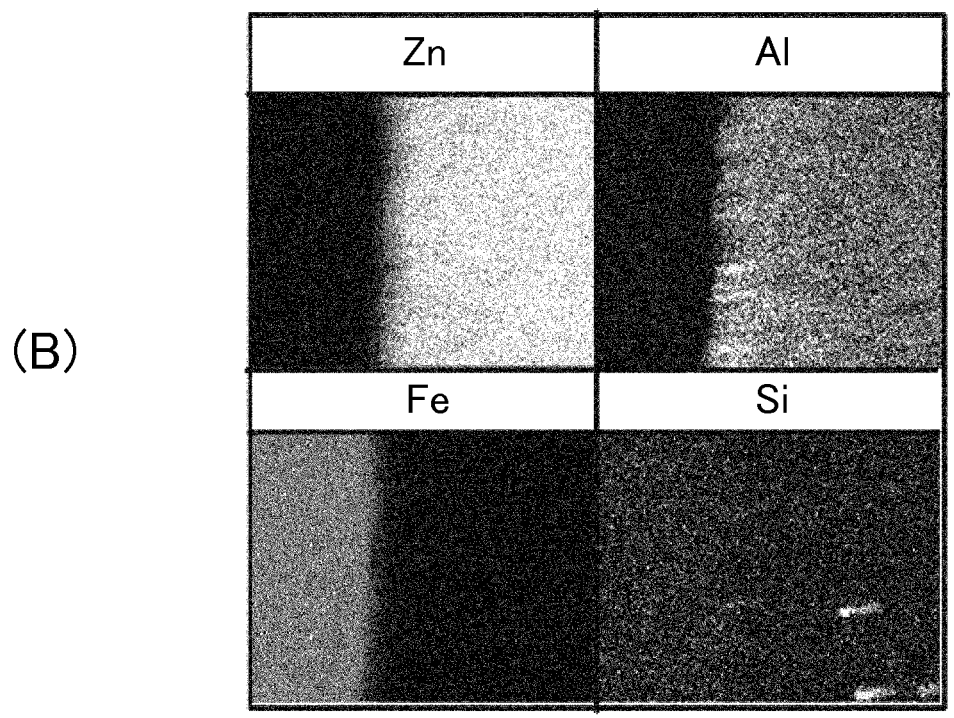

A test piece of the joined structure obtained using the Zn—Si-based filler metal having Si content of 1.0 wt % was subjected to elemental analysis by an electron prove microanalyzer (EPMA). The results obtained are shown in FIGS. 28(A) and 28(B). FIG. 28(A) is SEM photograph (left-side photograph) of the joint part of the joined structure and enlarged SEM photograph (right-side photograph) of the interface between the Fe-based metallic member and the joining layer in the photograph, and FIG. 28(B) is EPMA map analysis photographs (Zn, Al, Fe and Si) of the interface shown in the enlarged SEM photograph of FIG. 28(A).

Figure 29:
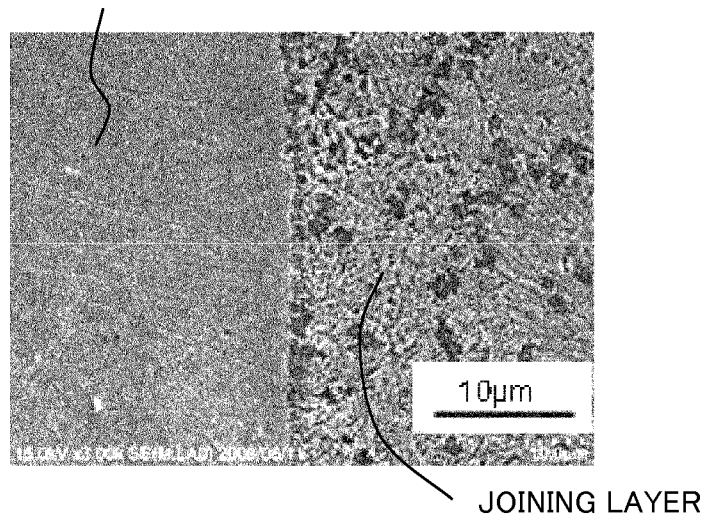
FIGS. 29(A) and 29(B) are SEM photographs of an interface between an Fe-based metallic member and a joining layer of Example 2.
Figure 29:
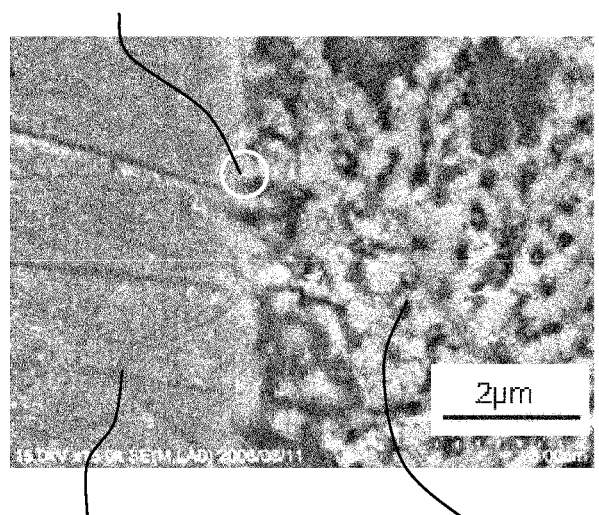

Regarding a test piece of the same joined structure, the interface between the Fe-based metallic member and the joining layer was observed with a scanning electron microscope (SEM). The results obtained are shown in FIGS. 29(A) and 29(B). FIGS. 29(A) and 29(B) are SEM photographs of the interface between the Fe-based metallic member and the joining layer. FIG. 29(A) is SEM photograph of 3,000 magnifications, and FIG. 29(B) is SEM photograph of 15,000 magnifications.

As shown in FIG. 28(A), an intermetallic compound layer was not observed in the interface between the Fe-based metallic member and the joining layer of Example 2. In the EPMA elemental map analysis shown in FIG. 28(B), Si was uniformly scattered, and the interface of Fe and Zn (that is, the interface between the Fe-based metallic member and the joining layer) was clearly observed. Al is Al of the Al-based metallic member, which was solid-solubilized to the joining layer by welding. Furthermore, as shown in the SEM photograph of 3,000 magnifications of FIG. 29(A) and the SEM photograph of 15,000 magnifications of FIG. 29(B), even though magnification in SEM observation was increased, an intermetallic compound layer was not observed in the interface between the Fe-based metallic member and the joining layer of the present example.

As is understood from the results of the above EPMA elemental map analysis and SEM observation, it was confirmed that a brittle intermetallic compound layer formed in the conventional joined structure (joined structure joined with a Zn—Si-based filler metal) is not present in the interface between the Fe-based metallic member and the joining layer when laser beam multiply reflects under the appropriate heat input conditions in the formation of a key hole in the same manner as in Example 1 except for using the Zn—Si-based filler metal as the filler metal.

[Joint Strength Evaluation of Metal Joined Structure]

A test piece of each joined structure using a Zn—Si-based filler metal having Si content of 0.25 wt %, 1.0 wt % or 2.5 wt % was subjected to a flare tensile strength test and a peel strength test. Two pieces at the central portion side of the joined structure and four test pieces at the both end portion sides thereof were used as the test piece. Those test pieces were allocated to each strength test, and one test piece at the central portion side and two test pieces at both end portion sides (total: three test pieces) were used in each of the flare tensile strength test and the peel strength test.

Figure 30:
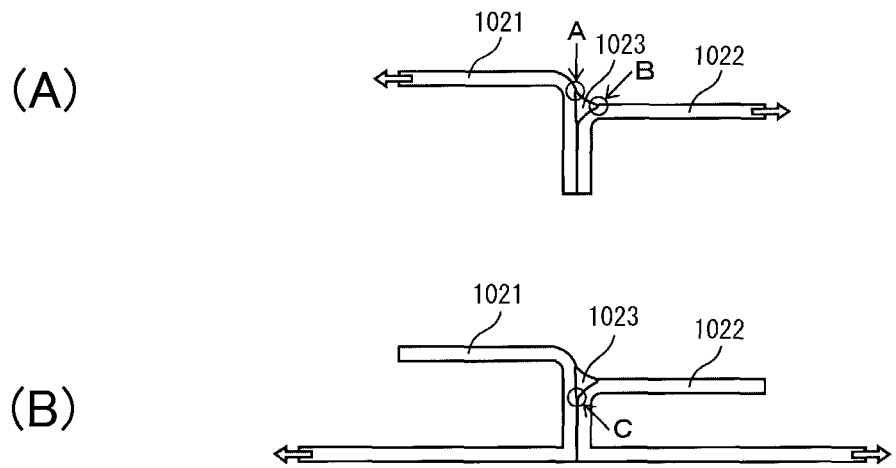
FIGS. 30(A) and 30(B) are schematic cross-sectional block diagrams of a joined structure for explaining methods of a flare tensile strength test and a peel strength test in Example 2.

In the flare tensile strength test, forces in mutually opposite directions were applied to the extending portions in a horizontal direction of a Fe-based metallic member 2021 and an Al-based metallic member 2022 that form a T-shape at an area on which a joining layer 2023 was formed, as shown in FIG. 30(A). In the flare tensile strength test, stress is most applied at the portions indicated by the arrows A and B.

Figure 31:
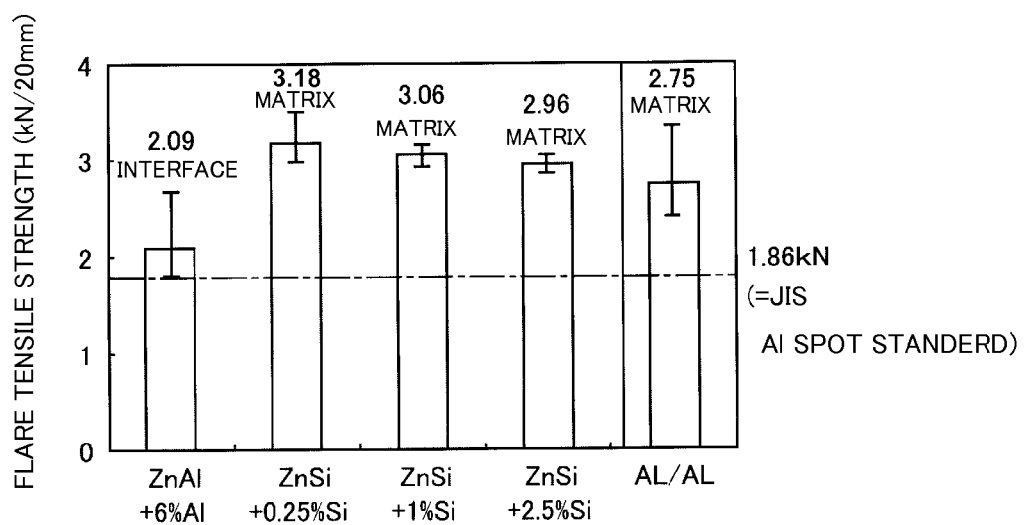
FIG. 31 is a graph showing strength of each sample obtained in the flare tensile strength test of Example 2.

The results (flare tensile strength value and rupture portion) are shown in Table 5 and FIG. 31. In Table 5, test results of test pieces of joined structures corresponding to the Zn—Si-based filler metals having Si content of 0.25 wt %, 1.0 wt % and 2.5 wt % are indicated as Samples 21 to 23, respectively. Table 5 also shows the results of Sample 24 and Comparative Samples 21. Sample 24 is a test piece of the joined structure of the Fe-based metallic member and the Al-based metallic member, obtained using a Zn—Al-based filler metal containing Al content of 6 wt %, and corresponds to the joined structure of Sample 111 of Example 1. Comparative Sample 21 is a test piece of the joined structure of two Al-based metallic members, obtained using the commercially available filler metal as a filler metal. Test pieces of Sample 24 and Comparative Sample 21 are obtained by cutting the joined structures obtained into strips similarly to Samples 21 to 23. FIG. 31 shows an average value of flare tensile strength of each sample and rupture portion.

Strength standard value of flare tensile strength test (dashed-dotted line of FIG. 31) is set as follows. Joint length of continuous welding equivalent to one shot of spot welding is set to 20 mm, and spot welding of Al each other in JIS 23140 was taken as the standard. By this, tensile strength standard of spot welding in which a plate thickness of Al is 1.2 mm is 1.86 kN/20 mm.

based metallic member, unlike Sample 24 which was ruptured in the interface between the Fe-based metallic member and the joining layer.

In the peel strength test, forces in mutually opposite directions were applied to the extending portions in a horizontal direction of the Fe-based metallic member 2021 and the Al-based metallic member 2022 that form a T-shape at an area opposite the area on which the joining layer 2023 was formed, as shown in FIG. 30(B). In the peel strength test, by concentrating high stress to a joined interface (the portion indicated by the arrow C), strength of joined interface can be measured.

Figure 32:
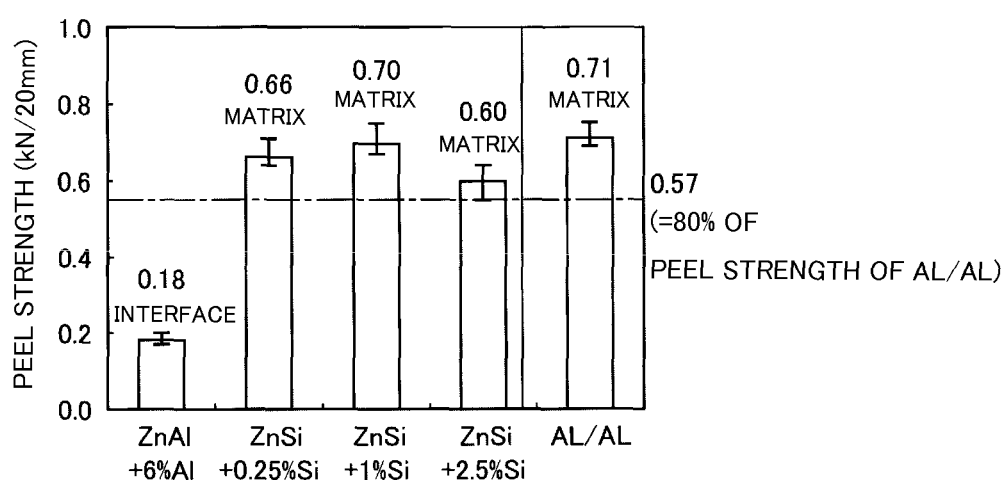
FIG. 32 is a graph showing strength of each sample obtained in the peel strength test of Example 2.

The results (peel tensile strength value and rupture state) are shown in Table 6 and FIG. 32. In Table 6, test results of test pieces of joined structures corresponding to the Zn—Si-based filler metals having Si content of 0.25 wt %, 1.0 wt % and 2.5 wt % are shown as Samples 31 to 33, respectively. Table 6 also shows the results of Sample 34 and Comparative Sample 31. Sample 34 is a test piece of the joined structure of the Fe-based metallic member and the Al-based metallic member, obtained using the Zn—Al-based filler metal containing Al content of 6 wt %, and corresponds to the joined structure of Sample 111 of Example 1. Comparative Sample 31 is a test piece of a joined structure of two Al-based metallic members, obtained using the commercially available filler metal as the filler metal. Test pieces of Sample 34 and Com-

TABLE 5

| | Combination of matrixes (upper) Material of filler metal (lower) | Tensile strength in each portion (KN/20 mm) | | | Average value of tensile strength (KN/20 mm) | Rupture portion |
|---|---|---|---|---|---|---|
| Sample 21 | Fe/Al ZnSi (Si content: 0.25%) | 2.97 | 3.40 | 3.18 | 3.18 | Al-based metallic member (HAZ) |
| Sample 22 | Fe/Al ZnSi (Si content: 1%) | 3.12 | 3.15 | 2.92 | 3.06 | Al-based metallic member (HAZ) |
| Sample 23 | Fe/Al ZnSi (Si content: 2.5%) | 2.96 | 2.86 | 3.06 | 2.96 | Al-based metallic member (HAZ) |
| Sample 24 | Fe/Al ZnAl (Al content: 6%) | 1.90 | 1.80 | 2.58 | 2.09 | Interface between Fe-based metallic member and filler metal |
| Comparative Sample 21 | Al/Al Commercially available filler metal | 3.35 | 2.51 | 2.40 | 2.75 | Al-based metallic member |

As shown in Table 5 and FIG. 31, tensile strength of Samples 21 to 23 according to the present invention that are joined structures of dissimilar metallic members exceeded the strength standard value. Furthermore, tensile strength of Samples 21 to 23 was higher than tensile strength of Sample 24 which is a joined structure of dissimilar metallic members, and was also higher than tensile strength of Comparative Sample 21 which is a joined structure of similar metallic members. It was confirmed that tensile strength was greatly improved in a small Si content (0.25 wt %). It was further confirmed that Samples 21 to 23 were ruptured in the Alparative Sample 31 are obtained by cutting the joined structures obtained into strips, similarly to Samples 31 to 33. FIG. 32 shows an average value of peel strength of each sample and rupture portion.

Strength standard value of peel strength test (dashed-dotted line of FIG. 32) is 80% of peel strength value of a test piece of Comparative Sample 31 (joined structure of Al-based metallic members) which is a joined structure of similar metallic members, obtained using the commercially available filler metal.

TABLE 6

| | Combination of matrixes (upper) Material of filler metal (lower) | Peel strength in each portion (KN/20 mm) | | | Average value of peel strength (KN/20 mm) | Rupture portion |
|---|---|---|---|---|---|---|
| Sample 31 | Fe/Al ZnSi (Si content: 0.25%) | 0.64 | 0.69 | 0.66 | 0.66 | Al-based metallic member (HAZ) |
| Sample 32 | Fe/Al ZnSi (Si content: 1%) | 0.67 | 0.75 | 0.67 | 0.70 | Al-based metallic member (HAZ) |

TABLE 6-continued

| | Combination of matrixes (upper) Material of filler metal (lower) | Peel strength in each portion (KN/20 mm) | | | Average value of peel strength (KN/20 mm) | Rupture portion |
|---|---|---|---|---|---|---|
| Sample 33 | Fe/Al ZnSi (Si content: 2.5%) | 0.61 | 0.64 | 0.55 | 0.60 | Interface between Fe-based metallic member and filler metal |
| Sample 34 | Fe/Al ZnAl (Al content: 6%) | 0.18 | 0.20 | 0.17 | 0.18 | Interface between Fe-based metallic member and filler metal |
| Comparative Sample 31 | Al/Al Commercially available filler metal | 0.75 | 0.69 | 0.7 | 0.71 | Al-based metallic member |

As shown in Table 5 and FIG. 32, peel strength of Samples 31 to 33 that are joined structures of dissimilar metallic members exceeded the strength standard. It was confirmed that peel strength of Samples 31 to 33 was greatly improved in a small Si content (0.25%), from the comparison with Sample 34 which is a joined structure of dissimilar metallic members. It was further confirmed that Samples 31 and 32 were ruptured in the Al-based metallic member similarly to Comparative Sample 31 which is a joined structure of similar metallic members, unlike Comparative Sample 34 which was ruptured in the interface between the Fe-based metallic member and the joining layer. It is presumed that peel strength of Sample 33 was slightly decreased by the decrease in the joined interface width due to the decrease in wettability, as compared with Samples 31 and 32, and Sample 33 was ruptured in the interface between the Fe-based metallic member and the joining layer.

As described above, in the samples which are the joined structures of dissimilar metallic members using the Zn—Si-based filler metal having an Si content of 0.25 wt % to 2.5 wt %, its strength exceeded the strength standard value. It was understood that strength was greatly improved in a small Si content (0.25 wt %) from the comparison with Comparative Samples which are the joined structures of the same dissimilar metallic members. Particularly, it was understood that the samples which are the joined structure of dissimilar metallic members using the Zn—Si-based filler metal having an Si content of 0.25 wt % to 1.0 wt % were not ruptured in the interface between the Fe-based metallic member and the joining layer, and were ruptured in the Al-based metallic member, and from this fact, a strong joined structure like the joined structure of similar metallic members can be obtained.

Although the present invention has been described in detail and by reference to the specific embodiments, it is apparent to one skilled in the art that various modifications or changes can be made without departing the spirit and scope of the present invention.

INDUSTRIAL APPLICABILITY

The present invention can be utilized in a method for joining metallic members, comprising joining the Fe-based metallic member and the Al-based metallic member by interposing the filler metal between the Fe-based metallic member and the Al-based metallic member, the joined structure and the filler metal.

DESCRIPTION OF REFERENCE NUMERALS AND SIGNS

| | |
|---|---|
| 1 | Fe-based metallic member |
| 2 | Al-based metallic member |
| 3 | Zn-based filler metal |
| 4 | Joining layer |
| 5 | Intermetallic compound layer |
| 1001 | Fe-based metallic member |
| 1002 | Al-based metallic member |
| 1003 | Zn-based filler metal |
| 1004 | Joining layer |
| 1005 | Key hole |
| 2001 | Fe-based metallic member |
| 2002 | Al-based metallic member |
| 2003 | Zn-based filler metal |
| 2004, 2014 | Joining layer |
| 2005 | Key hole |
| 2006 | Molten material |
| 2007, 2017 | Intermetallic compound layer |
| 2010, 2020 | Joined structure |
| 2013 | Groove shape |
| 2102 | Laser beam |

The invention claimed is:

1. A method for joining metal members, comprising:
   joining an Fe-based metallic member containing an Fe-based material and an Al-based metallic member containing an Al-based material by interposing a Zn-based filler metal between the Fe-based metallic member and the Al-based metallic member;
   forming a groove between the Fe-based metallic member and the Al-based metallic member;
   disposing the Zn-based filler metal on the groove; and
   heating a joined part of the Fe-based metallic member at a temperature higher than a melting point of the Fe-based metallic member by positioning a center line of a laser beam at a Fe-based metallic member side relative to a center line of the groove, such that a portion of the Fe-based metallic member is directly irradiated by the laser beam, and a size of the portion of the Fe-based metallic member directly irradiated by the laser beam is greater than a size of a portion of the Al-based metallic member directly irradiated by the laser beam.

2. The method according to claim 1, wherein heating the joined part of the Fe-based metallic member includes irradiating a single laser beam which directly impinges on and irradiates at least the portion of the Fe-based metallic member and the Zn-based filler metal.

3. The method according to claim 2, wherein the single laser beam directly impinges on and irradiates the portion of the Fe-based metallic member, the portion of the Al-based metallic member, and the Zn-based filler metal.

4. A method for joining metallic members comprising:
joining an Fe-based metallic member containing an Fe-based material and an Al-based metallic member containing an Al-based material by interposing a filler metal containing only Zn, Si and unavoidable impurities between the Fe-based metallic member and the Al-based metallic member.

5. The method according to claim 4,
wherein the filler metal contains 0.25 to 2.5% by weight of Si, and the remainder being Zn and unavoidable impurities.

6. The method according to claim 4 further comprising:
heating a joined part of the Fe-based metallic member at a temperature higher than a melting point of the Fe-based material.

7. The method according to claim 5 further comprising:
heating a joined part of the Fe-based metallic member at a temperature higher than a melting point of the Fe-based material.

* * * * *